United States Patent [19]
Hanify et al.

[11] Patent Number: 5,227,136
[45] Date of Patent: * Jul. 13, 1993

[54] BIOSLURRY REACTOR FOR TREATMENT OF SLURRIES CONTAINING MINERALS, SOILS AND SLUDGES

[75] Inventors: Douglas E. Hanify, West Valley City; Steven P. Duncan, Taylorsville; Robert C. Emmett, Jr.; Gunter H. Brox, both of Salt Lake City; Lawrence T. O'Connor, Midvale, all of Utah

[73] Assignee: Envirotech Corporation, Menlo Park, Calif.

[*] Notice: The portion of the term of this patent subsequent to Oct. 15, 2008 has been disclaimed.

[21] Appl. No.: 612,585

[22] Filed: Nov. 5, 1990

Related U.S. Application Data

[63] Continuation-in-part of Ser. No. 322,666, Mar. 13, 1989, Pat. No. 5,057,284, which is a continuation-in-part of Ser. No. 5,670, Jan. 21, 1987, Pat. No. 4,974,816, which is a continuation-in-part of Ser. No. 827,324, Feb. 7, 1986, Pat. No. 4,732,608.

[51] Int. Cl.$^5$ .............................. B01F 7/16; B01F 7/18
[52] U.S. Cl. .................................. 422/225; 422/227; 435/311; 435/314; 435/315; 435/262.5; 423/DIG. 17
[58] Field of Search ............... 435/813, 311, 314, 315; 210/197, 202, 208, 221.2; 422/135, 225, 227; 423/DIG. 17, 20

[56] References Cited

U.S. PATENT DOCUMENTS

| | | | |
|---|---|---|---|
| 3,060,005 | 10/1962 | Litchfield | 23/277 |
| 3,740,363 | 10/1969 | Fuller | 210/18 |
| 3,782,550 | 1/1974 | Materese | 210/134 |
| 3,786,922 | 1/1974 | Materese | 210/136 |
| 4,256,839 | 3/1981 | Solomons et al. | 435/314 |
| 4,298,349 | 11/1981 | Gabbay | 44/1 C |
| 4,613,434 | 9/1986 | Määttä | 210/151 |
| 4,728,082 | 2/1988 | Emmett, Jr. et al. | 266/168 |
| 4,732,608 | 3/1988 | Emmett, Jr. et al. | 75/101 R |
| 4,783,253 | 11/1988 | Ayres et al. | 209/2 |
| 4,974,816 | 12/1990 | Emmett, Jr. et al. | 266/168 |
| 5,000,860 | 3/1991 | Drewry | 210/271 |
| 5,043,283 | 8/1991 | Endo et al. | 435/286 |
| 5,057,284 | 10/1991 | Emmett, Jr. et al. | 422/225 |

Primary Examiner—James C. Housel
Assistant Examiner—Long V. Le
Attorney, Agent, or Firm—Trask, Britt & Rossa

[57] ABSTRACT

A reactor vessel for use in treating slurries containing minerals, soils or sludges contaminated with toxic organic substances is disclosed. The vessel includes a tank, having a sealed cover, a mixer arrangement, an air supply arrangement and an exhaust gas recycling system. The air supply arrangement includes one or more porous, flexible membrane diffusers adapted for introducing gas, in the form of fine bubbles, into a tank-contained slurry.

21 Claims, 19 Drawing Sheets

BIOSLURRY REACTOR FOR TREATMENT OF SLURRIES CONTAINING MINERALS, SOILS AND SLUDGES

BACKGROUND OF THE INVENTION

This is a continuation-in-part application of U.S. application Ser. No. 07/322,666 filed Mar. 13, 1989, issued Oct. 15, 1991 as U.S. Pat. No. 5,057,284, which is a continuation-in-part of U.S. application Ser. No. 005,670 filed Jan. 21, 1987, issued Dec. 4, 1990 as U.S. Pat. No. 4,974,816, which is a continuation-in-part application of U.S. application Ser. No. 827,324 filed Feb. 7, 1986, issued Mar. 22, 1988 as U.S. Pat. No. 4,732,608. The disclosures of those applications are hereby incorporated by reference.

FIELD

This invention relates to apparatus for treating slurries containing minerals, soils and sludges which have been contaminated with toxic organic compounds making them hazardous waste under environmental laws and regulations. More particularly, this invention is directed to an apparatus suited for treating hazardous waste-contaminated solids by means of a bacterial process, i.e., bio-oxidation.

STATEMENT OF THE ART

Within the last decade, public concern regarding environmental pollution issues has increased markedly As growing industrial activity continues to produce new and more complex waste byproducts, the need for safely disposing of those byproducts poses a critical problem for society. In the area of hazardous waste, this need is especially critical in that the particular type of waste constitutes a problem affecting the health and safety of individuals exposed to them.

Former industry practices have resulted in spills and leaks which have led to the contamination of underground water supplies and surrounding soil. Moreover, past illegal disposal in now-abandoned waste dumps presently poses a threat to the environment and concerns nearby residents. Also, in many industrial facilities, wastewater was previously disposed of in unlined lagoons which have leaked and contaminated the groundwater. These lagoons often contain considerable quantities of hazardous waste sludges. There is a pressing need to clean up contaminated waste sites and close existing industrial wastewater lagoons.

Several treatment technologies are applicable and can be classified under the general categories of physical, chemical and biological treatment. With respect to biological treatment of soil or sludges one can differentiate between in situ treatment and the treatment of liquefied soil slurries in reactor vessels. The apparatus proposed in the following disclosure falls into the latter category.

Presently, three other bioslurry reactor systems are being commercialized. The first system, developed by Bogard Environmental Services, Inc. of Mt. Juliet, Tenn. involves technology adapted for use in treating pesticides, PCB's, dioxins and halogenated and non-halogenated organic compounds. While having presently demonstrated effectiveness for treating sludge, liquids and soils having high organic concentrations, the this process has been found to be unsuitable for use with inorganic laden wastes.

The second technology, developed by Detox Industries, Inc. of Sugarland, Tex., is directed for use in treating chlordane, myrex, oil, phenolics, polycyclic aromatic hydrocarbons, creosote, pentachlorophenol (PCP) and polychlorinated biphenyls (PCB's).

The Detox system includes an open-topped reaction tank or on-site created lagoon which utilizes a synthetic liner. The tank is adapted to retain a slurry and is fitted with air distributors.

Another bioslurry reactor consisting of several agitated and aerated vessels has been used in a pesticide spill application by ECOVA of Redmond, Wash.

Common to all three of the above-described systems is the fact that they are operated in a batch mode. After the contaminated soil has been first processed through a classification or soil wash system, the soil and water are placed into the reactor vessel, the soil is aerated until a desired residual contaminant level is reached, whereupon the supernatant water is usually recycled and the slurry is discharged. Due to the ongoing aeration, many volatile organic substances are not biodegraded but rather are air-stripped. Some systems treat the volatiles in a carbon adsorption filter whereas others simply discharge them to the atmosphere.

Common to all hazardous waste treatment systems utilizing bacterial activity is the requirement of providing an adequate supply of oxygen and nutrients to the bacteria. This provision allows biomass growth and facilitates the occurrence of biochemical reactions, thereby leading to the production of carbon dioxide and water as final products. Various approaches have been advanced to optimize bioactivity level in reactor vessels. In those systems wherein a multiplicity of connected reactor vessels have been suggested, e.g. cascade systems, a common problem is the retention and maintenance of biomass in a given reactor as effluent from that reactor is directed to the next reactor.

The clean up of hazardous waste sites requires innovative approaches that are cost effective. As has been the case in the wastewater treatment sector, biological systems can also play an important role in soil bioremediation. It is important, however, to develop reactor vessels and processes that can achieve high biokinetic degradation rates in order to handle high solids concentrations and large throughput volumes in order to be cost effective.

SUMMARY OF THE INVENTION

The instant invention is directed to a bioreactor vessel adapted for treating a slurry containing minerals, soils and/or sludges which have been contaminated by toxic organic substances.

The bioreactor vessel of the invention includes generally a tank having a bottom, upstanding walls fixedly mounted thereon and a sealed top or cover. The tank is adapted to receive and contain a slurry. The tank is fitted with a mechanical mixing means which operates to effectuate an agitation and suspension of the particulates within a slurry housed within the tank. In some constructions, an air supply means mounted within the reactor operates to provide oxygen, a necessary component of the bio-oxidation reaction taking place within the bioreactor. In alternative constructions wherein an anaerobic process is utilized, the air supply means may be deleted. The air supply means also is configured such as to provide suspension of the particulates within the slurry liquid housed within the tank. In addition, an airlift is provided for recirculating particulates which have settled out of the slurry.

In preferred arrangements, the system of the invention includes a plurality of reactor vessels connected in series.

The tank may include a drive shaft, having arms radially mounted thereon, adapted to be rotated. This rotation of the arms provides a mechanical mixing and agitation of the slurry contained in the tank and further provides a means for conveying settled solids to a center airlift shaft for the purpose of their recirculation. In alternate constructions, a peripheral lift, e.g. an airlift system, may be utilized wherein slurry is removed from the reactor, elevated to a selected elevation and then reintroduced into the reactor at the new elevation. One or more rotatable impellers, mounted on the drive shaft, is an option for certain applications. In those constructions which use a plurality of impellers, they may be positioned in a staged orientation.

The air supply means of the invention generally involves the introduction of minute air bubbles near the bottom region of the tank by a plurality of elastic membrane diffusers. The diffusers are mounted and oriented in such a way that their rotation about a vertical axis causes the slurry in close proximity to the diffusers to be agitated. The diffusers may be mounted along the length of each radial arm of the slurry mixer mechanism or perpendicular to it. The radial arms may be rotated about an essentially upright, vertical axis. The diffusers are thus rotated so as to distribute rising air bubbles effectively over a substantially horizontally oriented planar area of the lower region of the tank.

The number of individual diffusers employed and their location relative to each other and to the plan area by way of their mounting on the radial arms of the slurry mixer are determined by the total amount of air required for the bio-oxidation occurring within the bioreactor. Further, the number and location of diffusers are determined by the oxygen transfer efficiency and capacity of the individual diffusers. The diffusers are mounted on the radial arms of the slurry mixer so as to minimize coalescence of air bubbles and thus to obtain optimum oxygen transfer efficiency.

Further, the slow rotation of slurry mixer mechanism causes minimal drag forces, thereby minimizing energy consumption as compared with the conventional means of utilizing a turbine mixer.

Another benefit of the slow-moving radial arms is the minimization of shear-related degradation, i.e. destruction of bacteria and flocs and their attachment to solid particles in the container.

Slurry may be drawn from the lower portions of the tank through a hollow center shaft pipe and thereafter be directed upwardly to radially-mounted distributor pipes. Those pipes may be positioned above the slurry or, alternatively, they may be positioned to discharge into the body of the slurry itself. The distributor pipes may direct the lifted slurry outward and downward onto the surface of the slurry retained in the vessel. A lifting mechanism to mechanically raise and lower the radial mixing and conveying arms of the bioreactor may be provided to facilitate start-up out of a consolidated sludge bed.

Since the bio-oxidation occurs at a better kinetic rate in a narrow temperature range, temperature control in the reactor is required, best achieved through preheating of the slurry and heat preservation through insulation of the tank walls.

Maintaining a high biomass concentration in the reactor is a task requiring the use of equipment ancillary to the bioreactor. A screening mechanism is used to keep a biomass-carrying medium from leaving the reactor vessel.

The instant invention also includes a means and method of recirculating the exhaust gas stream from each reactor back into the reactor-contained slurry by means of the diffusers. This recycling minimizes the need for effluent (off-gas) treatment and thus reduces the operating cost of the reactor.

The present invention involves an apparatus and a method of processing hazardous waste organic compounds. A slurry-forming means is provided for adding water to the minerals, soils or sludges, which have become contaminated with the hazardous organic compounds, to form a slurry. A screening means, which is associated with the slurry-forming means to permit flow communication therebetween, is adapted to screen the slurry to remove all solid material over a preselected size from the slurry to thereby constitute a quantity of classified, slurried fine soil. A washing means, mounted in flow communication with the screening means, is adapted to receive the quantity of sized soil and wash the coarse soil. A classifying means, associated with the washing means, is adapted to receive the quantity of sized soil and remove therefrom fine material of a preselected size as well as excess water. A container means is associated in flow communication with the classifying means. The container means has elastic membrane diffusers positioned on radial arms in the lower regions thereof. The diffusers are mounted to be rotated by a driving means for thereby distributing fine bubbles over substantially the entire cross-section of the tank. An airlift means, in association with raking means, is adapted for collecting particulates which have settled on the floor of the tank and reintroducing those particulates back into the slurry. The method further includes a means of processing effluent exhaust gases from each reactor vessel by passing the gas through a scrubber for removing the $CO_2$ from the gas. Subsequently, oxygen-, methane- and/or nitrogen-containing gas are added to the exhaust gas to produce a gas stream having preselected concentrations of those gases. Thereafter, those gases are reintroduced to the various reactor vessels by means of the diffusers and the airlift. A dewatering means is associated with the container means for receiving slurry/soil from the container means for dewatering the slurry.

DESCRIPTION OF THE ILLUSTRATED EMBODIMENTS

Figure 1:
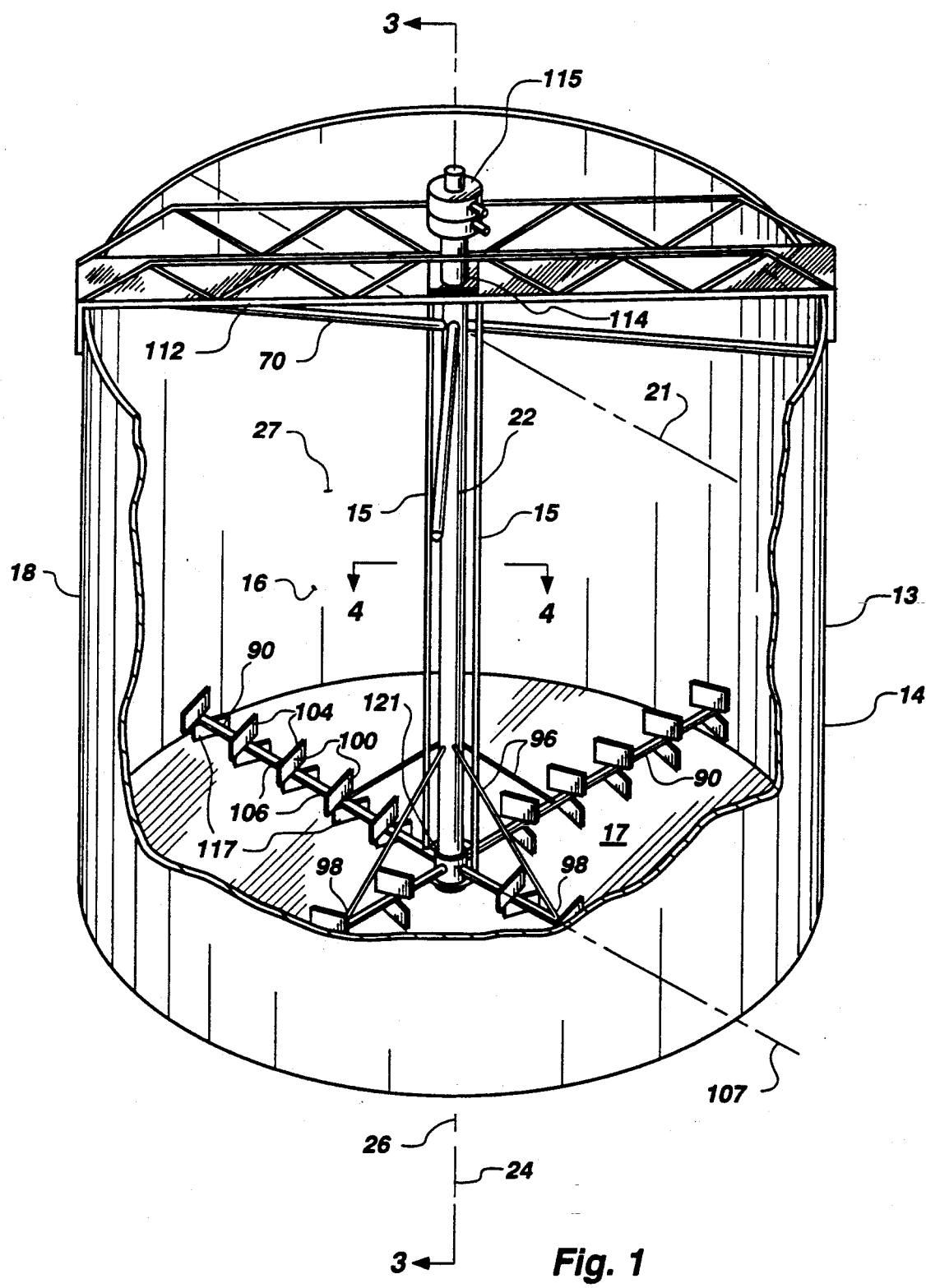
FIG. 1 is an elevated perspective view of the bioreactor vessel of the instant invention including a cut-away portion which reveals a centrally positioned support member fixedly mounted with a plurality of rotating, radially extending arms positioned about a lower section of that support member.

As shown in FIG. 1, a bioreactor vessel, generally 13, of the instant invention includes a tank 14 having suspended therein an air supply means generally 15, adapted to inject air, received from a source exterior of the tank 14, into a liquid medium (slurry), generally 16, which is contained within the tank.

The tank 14 consists generally of a bottom member 17 which is fixedly and sealingly mounted with an upstanding vertical wall or walls 18. As shown, the bottom member 17 may be generally planar and circular in plan view. The upstanding vertical walls 18 may be a single tubular-shaped wall whereby the tank obtains a substantially cylindrical configuration. In a preferred embodiment, the vertical walls 18 define a tank diameter 21 which remains constant over the height of the tank. The upright walls 18 and the bottom planar member 17 are fabricated from materials, e.g. stainless steel, which are chemically resistant to the solids, slurry or byproducts which may be housed within the tank.

Positioned within the tank is an air supply means 15. As shown, this supply means may include an elongate tubular support shaft 22 which may be positioned centrally and upright within the tank 14. Shaft 22 includes a longitudinal axis 24 which is oriented substantially upright and passes through, or may be collinear to, the longitudinal axis 26 of the tank 14. The support shaft 22 may be structurally configured in a variety of shapes. As shown, the support shaft 22 may be a substantially cylindrical, tubular pipe member which extends from an elevation, which is above any anticipated liquid level 27 to be obtained within the tank 14, downwardly to an elevation proximate the bottom plate 17 of the tank. Shaft 22 is connected to a drive motor 29 which is mounted on the top of the tank 14. Motor 29 is used to rotate shaft 22 about its axis 24.

Figure 5:
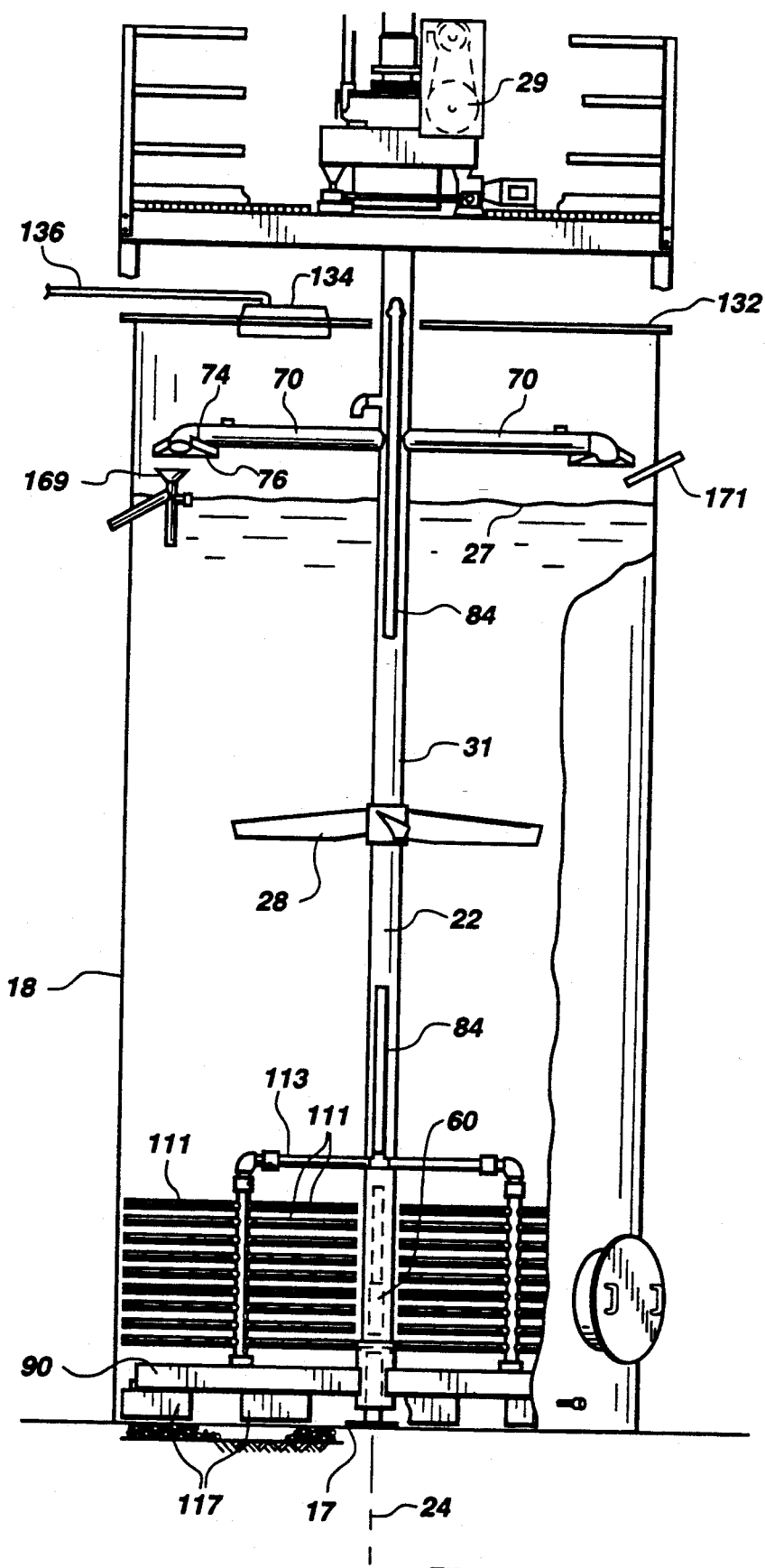
FIG. 5 is a cross-sectional view of a second embodiment of a reactor vessel of this invention.
Figure 24:
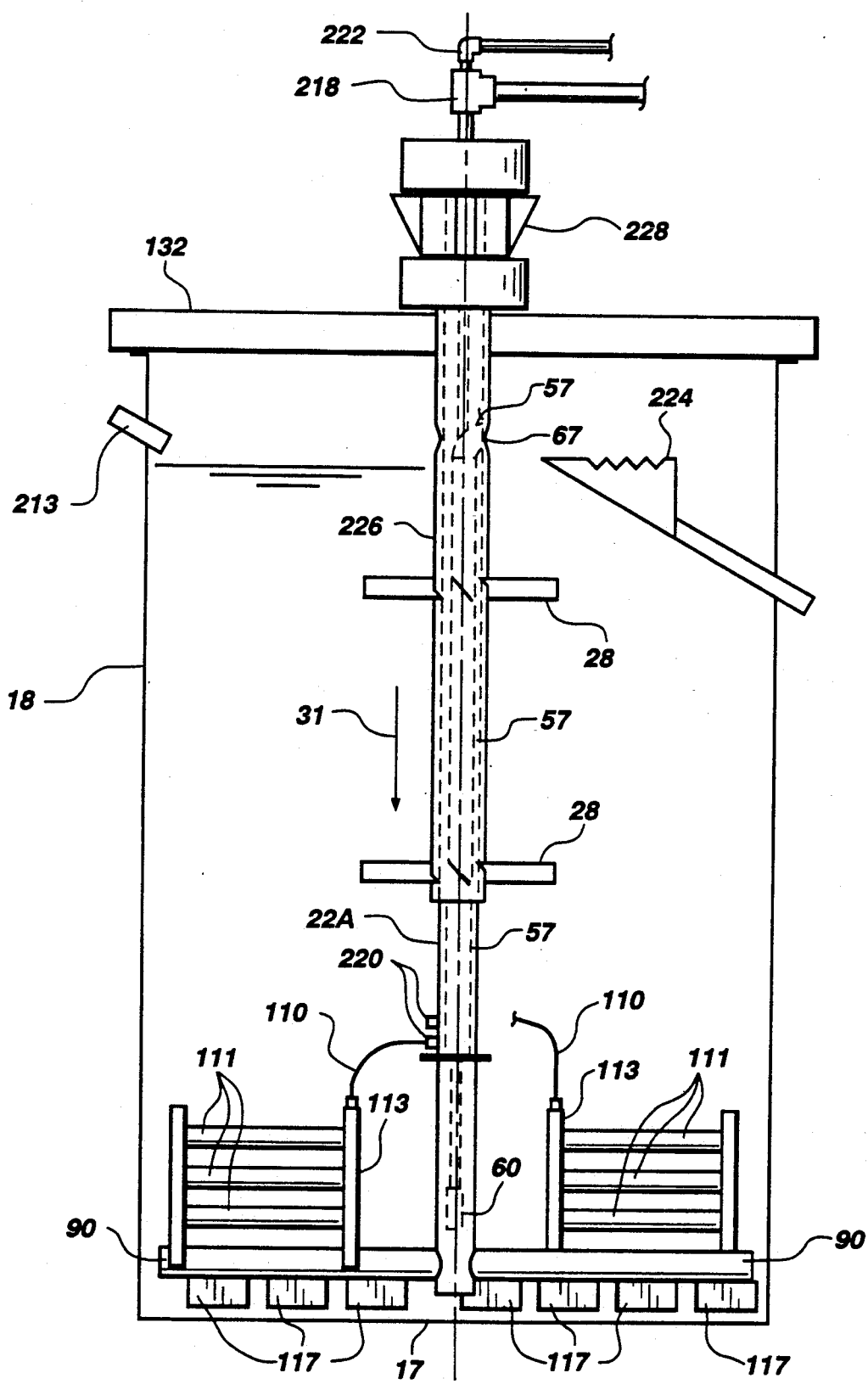
FIG. 24 is a cross-sectional view of an alternative construction of the bioreactor of FIG. 20 illustrating the placement of a staged impeller arrangement on the drive shaft.

As shown in FIG. 5, the tank 14 may include a mixing impeller 28 mounted within the interior of the tank. The impeller is constructed and positioned to induce a downwardly directed flow of slurry upon its rotation, i.e. slurry flow in the direction indicated by arrow 31. The impeller, in causing a downward slurry flow, functions to increase the slurry residence time of air bubbles being injected into the slurry proximate the bottom of the tank, in that the downwardly directed slurry flow tends to force the bubbles downward in opposition to their upwardly directed rising displacement induced by the specific gravity differential between the bubbles and the slurry. Alternatively, the impeller may be utilized to induce an upward slurry flow within the reactor vessel. In alternative embodiments, a plurality of impellers may be mounted on the drive shaft 22. As shown in FIG. 24, two impellers 28 are shown mounted on the shaft 22 in a staged arrangement.

The impeller(s) 28 is preferably dimensioned to have a diameter which is approximately two-thirds ($\frac{2}{3}$) of the diameter of the tank 14. In other constructions, the impeller is dimensionally between 0.3 and 0.6 of the tank diameter. With this dimensioning, the impeller creates a downward directed flow over a major interior volume of the tank while likewise creating an upwardly directed slurry flow (see arrows 31A) about the boundary region of the tank. This particular flow contributes to overall mixing and resuspension action for solids within the slurry in conjunction with the diffuser's action.

In a preferred arrangement (FIG. 24) the impellers 28 may be mounted on the support shaft 22 and are therefore rotated together with shaft 22 by motor 228. In an alternate embodiment, the impeller 28 may be linked to a separate drive motor via a drive shaft 22 which is oriented concentric with shaft 22. In this alternate embodiment, the impeller may be rotated at a different speed than shaft 22. Another embodiment utilizes one or more vertical mixing shafts and impellers which are mounted off-center, i.e. not concentric with shaft 22 from the top or cover of the tank or entering from the sides of the tank.

The slurry temperature in the reactor should be controlled. Depending on the particular bacteria employed in the vessel, the temperature will generally be maintained within the range of 20°-35° C.

This temperature may be controlled by preheating the feed slurry being added to the reactor. Additionally, the reactor tank itself may be covered with insulation to assist in retaining heat.

Figure 3:
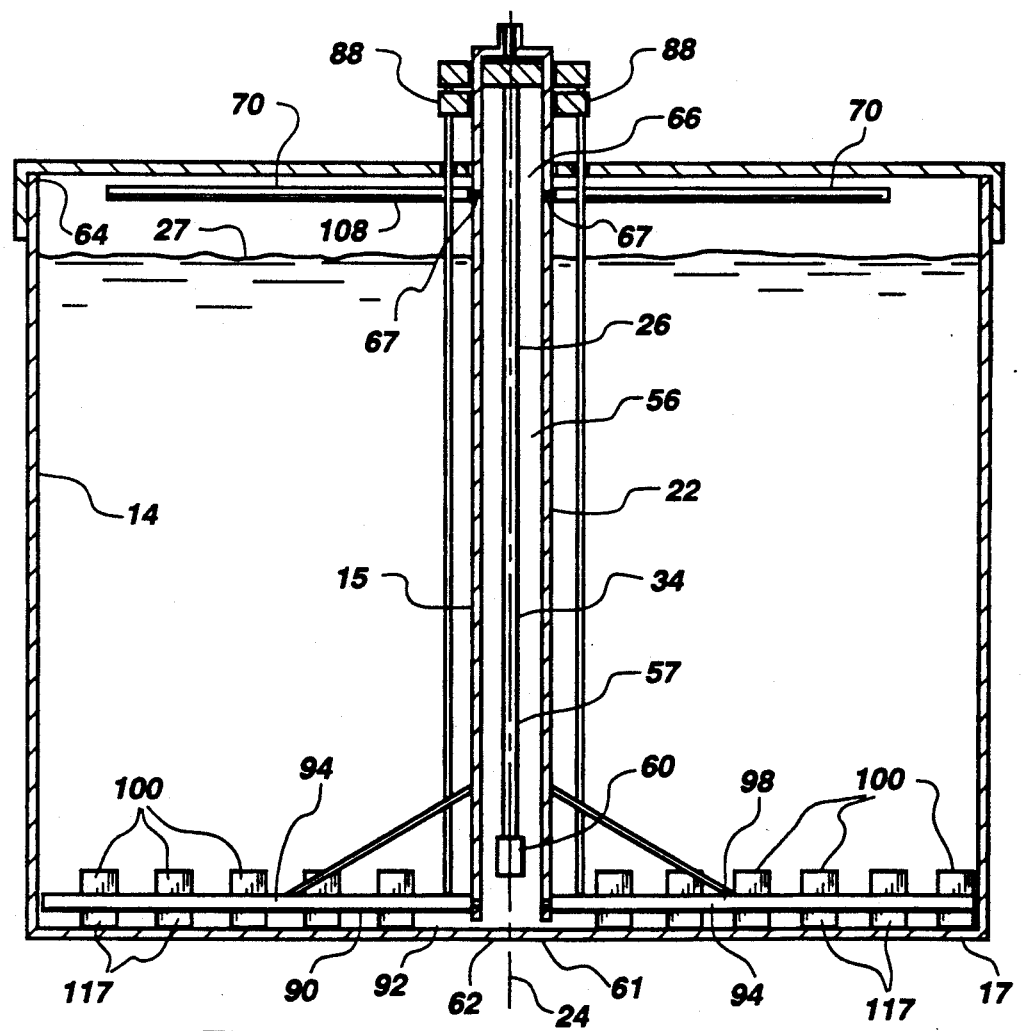
FIG. 3 is a cross-sectional view of the bioreactor vessel shown in FIG. 1.

As shown in FIG. 3, a hollow pipe 57 extends through the hollow interior channel 34 of shaft 22 to a location proximate the bottom 17 of tank 14. The pipe 57 may be fitted on its end with one or several diffusers 60. Air may be injected through pipe 57 to diffuser 60 and thereafter into the channel 34. Channel 34 communicates with the slurry 16 within the tank 14 by means of an access port 61. Access port 61 is defined by the open end 62 of shaft 22 which is positioned above and out of contact with bottom member 17 of tank 14. As air is injected into the interior of channel 34, a portion of the slurry contained within the channel 34 is driven upwardly along channel 34. Upon reaching the region 66 of channel 34, the slurry portion is directed outward through ports 67 to a plurality of hollow distributor tubes 70 which are fixedly mounted to shaft 22. The pipe 57 and diffuser 60 form an air lift means.

As shown in FIG. 5, each tube 70 extends radially from shaft 22 and is positioned elevationally above the surface 27 of the slurry. Each tube 70 is fitted at its end 74 with a discharge nozzle 76 which directs the slurry downward. Since the tubes 70 are rotated about axis 24 by shaft 22, the slurry is discharged over a substantially circular pattern over surface 27 of slurry 16.

In an alternative embodiment, the distributor pipes 70 are positioned lower on shaft 22 whereby the slurry being lifted upwards through channel 34 is discharged outwardly into the body of the slurry instead of being discharged downwardly onto the surface of the slurry. Any foam created on the slurry surface 27 by the action of the distributor tubes 70 is broken up by the addition of defoaming agents to the slurry. In alternative constructions, a jet pump mounted within the reactor vessel can be used for foam control.

Figure 4:
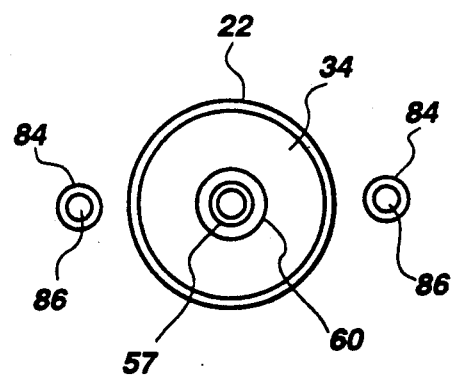
FIG. 4 is a cross-sectional view taken of the support shaft of the bioreactor vessel shown in FIG. 1 taken along sectional lines 3—3.

As shown in FIG. 4, a pair of cylindrical, tubular pipe members 84, each defining an interior channel 86, are mounted adjacent shaft 22. Pipes 84 extend from a rotary valve equipped gas supply means 88, positioned proximate the upper end of shaft 22, downwardly to a plurality of arms 90, mounted radially on shaft 22. Gas supply means 88 is adapted to provide a supply of oxygen-containing gas under pressure to channels 86 and force that gas along the length of those channels 86. Channels 86 communicate at their respective lower ends with one or more channels 94 defined within the interior of each radially extending arm 90.

Each radial arm 90 extends essentially perpendicular outwardly or radially from the support shaft 22 and is dimensioned to extend from that shaft 22 to a location proximate the wall 18 of the tank 14.

As shown in FIG. 1, each radial arm 90 is fitted with a plurality of diffusers 100. Each diffuser individually communicates with the interior channel 94 of the radial arm 90. Air contained in channels 94 is directed outwardly from the arms 90 into the diffusers 100, thereby permitting the oxygen or air to be directed upwardly and outwardly into the slurry 16 residing within the tank 14. The air or oxygen within the diffuser 100 is typically under a pressure sufficient overcome the hydrostatic pressure and any pressure drop across the membrane.

In preferred embodiments, the diffusers 100 each include an elastic permeable, porous, replaceable membrane 101 having a hydrophobic outer surface. The membrane 101 defines a plurality of extremely small slits preferably having a mean length of 1.5 mm or less.

Preferred embodiments of the diffuser 100 may utilize membranes fabricated from materials which are chemically resistant to the contaminants contained in the slurry. Such materials may include various rubber compounds, polypropylene, fluorinated elastomer, and/or similar compounds. Preferably, the materials used must be elastic and clog-free.

Figure 2:
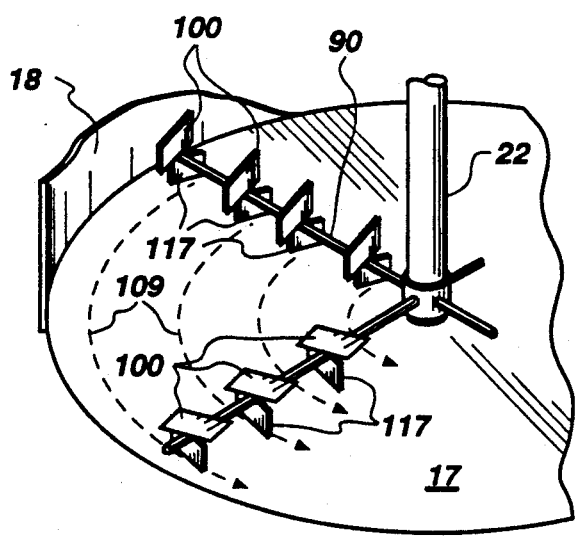
FIG. 2 is an elevated perspective view of the lower portion of the support member shown in FIG. 1.

As shown in FIG. 2, the diffusers 100 may be generally planar members oriented vertically upright or, alternatively, they may be oriented horizontally.

Figure 8:
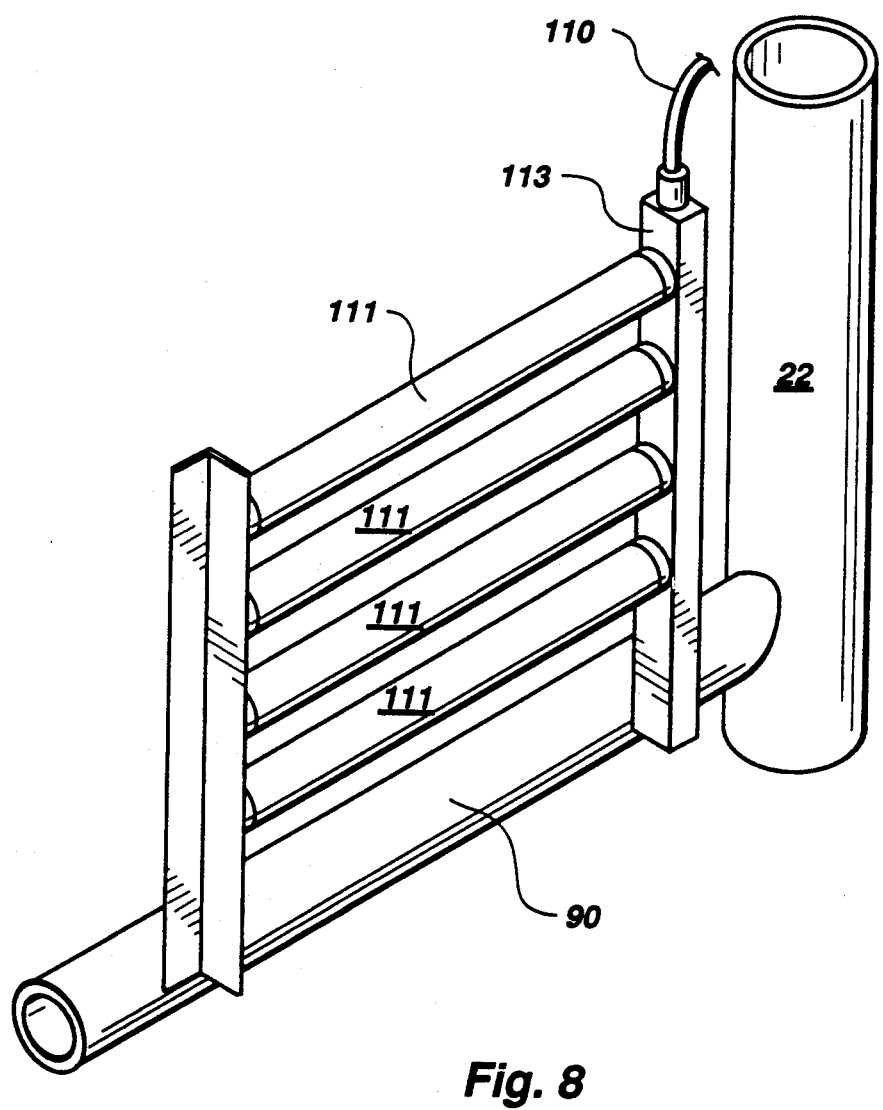
FIG. 8 is a perspective view of an arrangement of diffusers of the invention.
Figure 9:
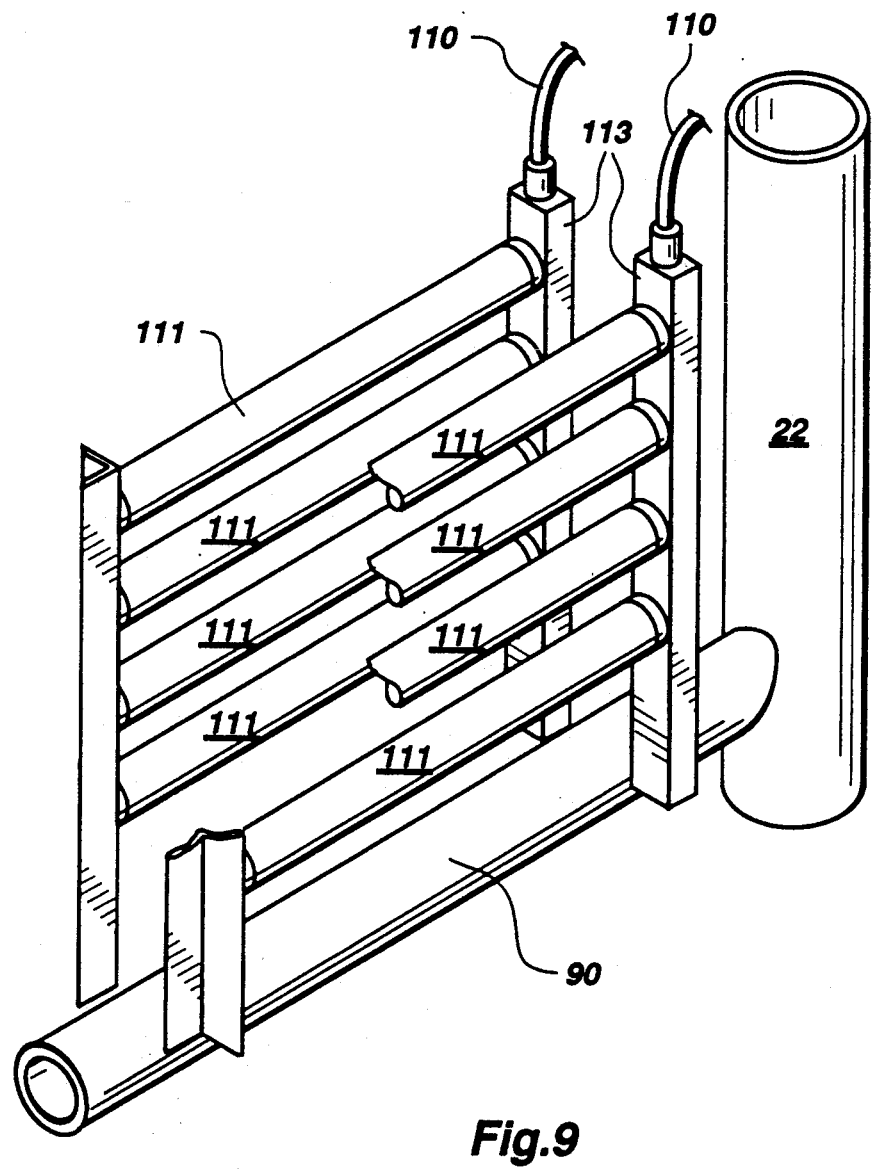
FIG. 9 is a perspective view of an alternative diffuser arrangement.
Figure 10:
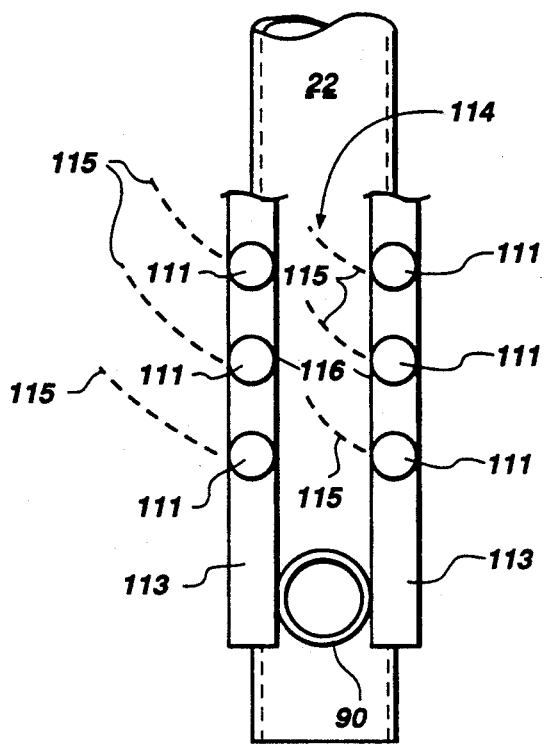
FIG. 10 an end view of the diffuser arrangement of FIG. 9.

Preferred embodiments of the diffuser apparatus are shown to advantage in FIGS. 8–10. As illustrated in FIG. 8, a diffuser construction provides a plurality of tubular cylindrically shaped diffusers 111 arranged atop one another to form a vertically stacked array. This diffuser embodiment includes a manifold 113 which introduces air into each tubular diffuser element 111. The manifold 113 may include a plurality of graduated orifices adapted to adjust the volume of air being directed to each respective diffuser 111. Each of the tubular diffusers 111 generally comprises a pair of spaced solid endwalls 115 and a skeletal frame that extends therebetween. A curved tubular sidewall fabricated from a porous flexible membrane 101 is wrapped over the frame and extends between the endwalls. Manifold 113 is supplied with pressurized air by a flexible hose 110 which is connected to a source of pressurized air.

The support shaft 22 functions as a drive shaft for rotating the plurality of radially extending arm members 90.

FIGS. 9–10 in conjunction with FIG. 5 illustrate an alternative diffuser structure. In this construction a plurality of tubular diffuser structures 111, similar to those of FIG. 8, are arranged to extend outwardly from a pair of manifolds 113, mounted on radial arm 90. The manifolds 113 are connected directly to a respective pipe member 90. In this construction, the arm 90 does not define an air-carrying channel 94; instead, pressurized air is provided by air hoses 110.

As shown, each of the tubular diffusers 111 are oriented to extend radially outward from the shaft 22. The diffusers 111 are arranged in two vertically stacked arrays or banks. In each bank of diffusers, vertically adjacent diffusers 111 are positioned spacedly apart from one another, thereby defining a passageway 114 between each pair of adjacent diffusers. When the diffusers 111 are rotated about axis 24 by shaft 22, a stream of slurry passes through each of the passageways 114. In doing so, each respective slurry stream flows over substantially half of the exterior surface area of each of the two diffusers 111 which define the respective passageway 114. The slurry streams function to drive forcedly the bubbles, exiting each diffuser 111, in a lateral direction. Since adjacent slurry streams substantially sweep over the entire surface of a diffuser positioned therebetween, the majority of bubbles exiting any given diffuser are driven laterally rearwardly of the diffuser. When this stream-induced displacement is considered together with the upwardly-directed displacement of the bubbles induced by the specific gravity differential of the bubbles verses the slurry, the bubble flow paths 115 become generally those indicated by the dotted lines in FIG. 10. The operation of the passageways 114 reduces the coalescence of bubbles from different diffusers in that the bubbles are dispersed over a wider spatial area, instead of merely rising vertically.

As shown to advantage in FIGS. 9 and 10, each pair of vertical diffuser banks are positioned spacedly apart from one another by a sufficient distance 116 that bubbles exiting the diffusers 111 of the bank 118A may rise upwardly through the slurry before the rear diffuser bank 118B is displaced into the bubble flow path 115 of the bubbles exiting the forward bank.

The vertical spacing between the adjacent diffusers 111 in the two diffuser banks and the spacing between adjacent vertical diffuser banks is determined experimentally for a given diffuser construction and shaft 22 rotational speed. FIGS. 20–24 illustrate a reactor vessel wherein diffuser structures similar to those shown in FIGS. 9-10 are shown installed within the reactor vessel.

As shown in FIG. 1, positioned on the upper region of tank 14 is a bridge support 112 which extends essentially across the diameter 21 of tank 14. Shaft 22 is journaled in bridge support 112. A motor 29 operates to rotate shaft 22 about its axis 26 and thereby effecting a rotation of arms 90 and distributor arms 70.

As shown in FIG. 3, fitted on the lower surface of each radial arm 90 is a plurality of rake blades 117. These blades 117 are adapted to move settled solids across the tank bottom 17 to a central collecting location proximate access port 61. The critical aspect of the blades' 117 orientation is the requirement to direct solids which have become deposited on the bottom 17 of the reactor vessel 13, to a common collection location proximate the airlift shaft access port 61.

The radially extending arms 90 may be mounted on shaft 22 to be vertically slidable along that shaft.

FIG. 5 illustrates a preferred embodiment of an individual reactor vessel system. As shown, the top of tank 14 is sealed from the environment by a sealing cover 132. The shaft 22 is fitted with a water-tight seal to seal it against cover 132. A filter 134, mounted in the upper reaches of the tank 14, is adapted for drawing off gases from the tank and directing them to a processing means located exterior from the tank.

Figure 6:
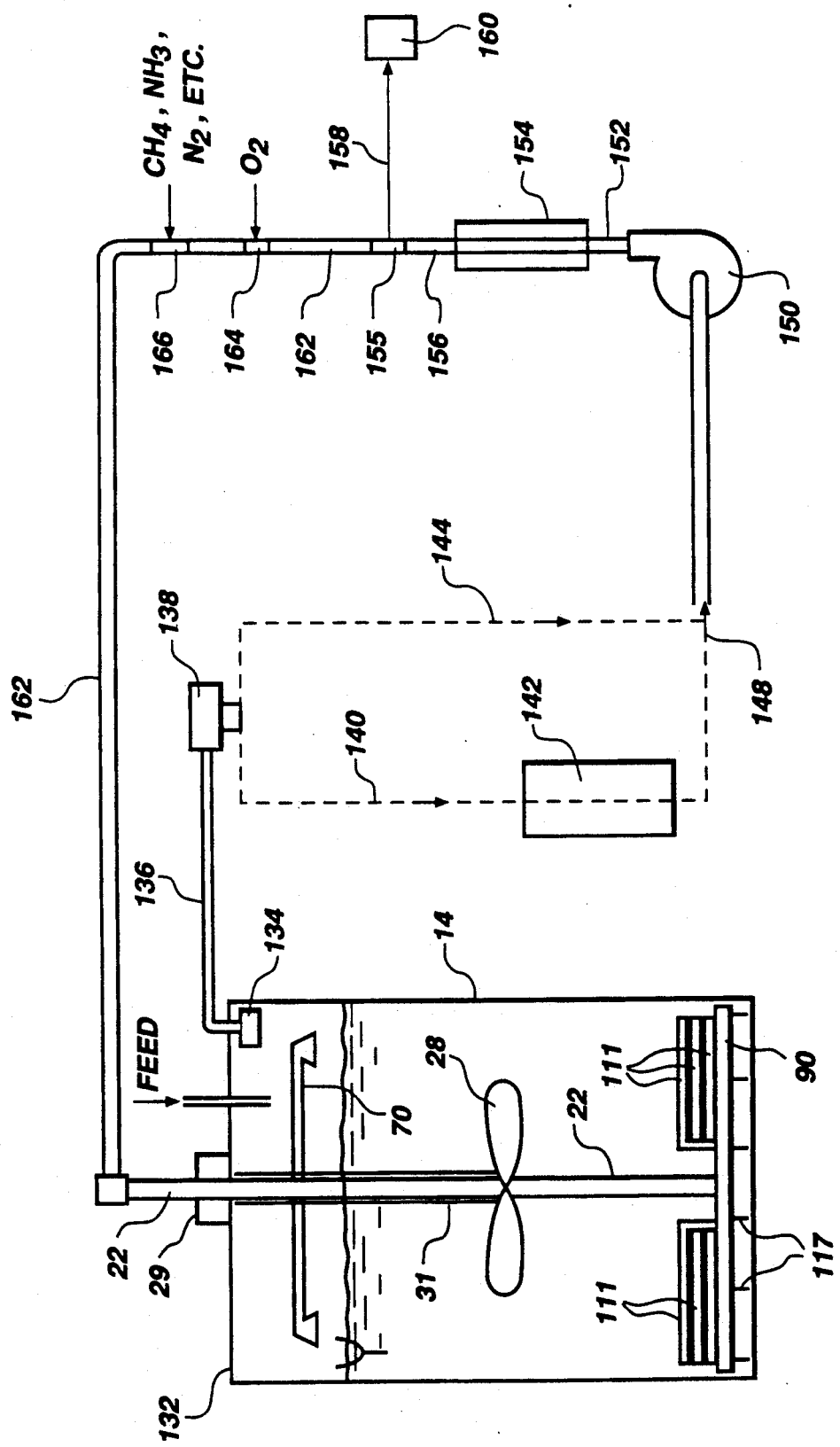
FIG. 6 is a schematic diagram of the exhaust gas recirculation system of the invention.
Figure 7:
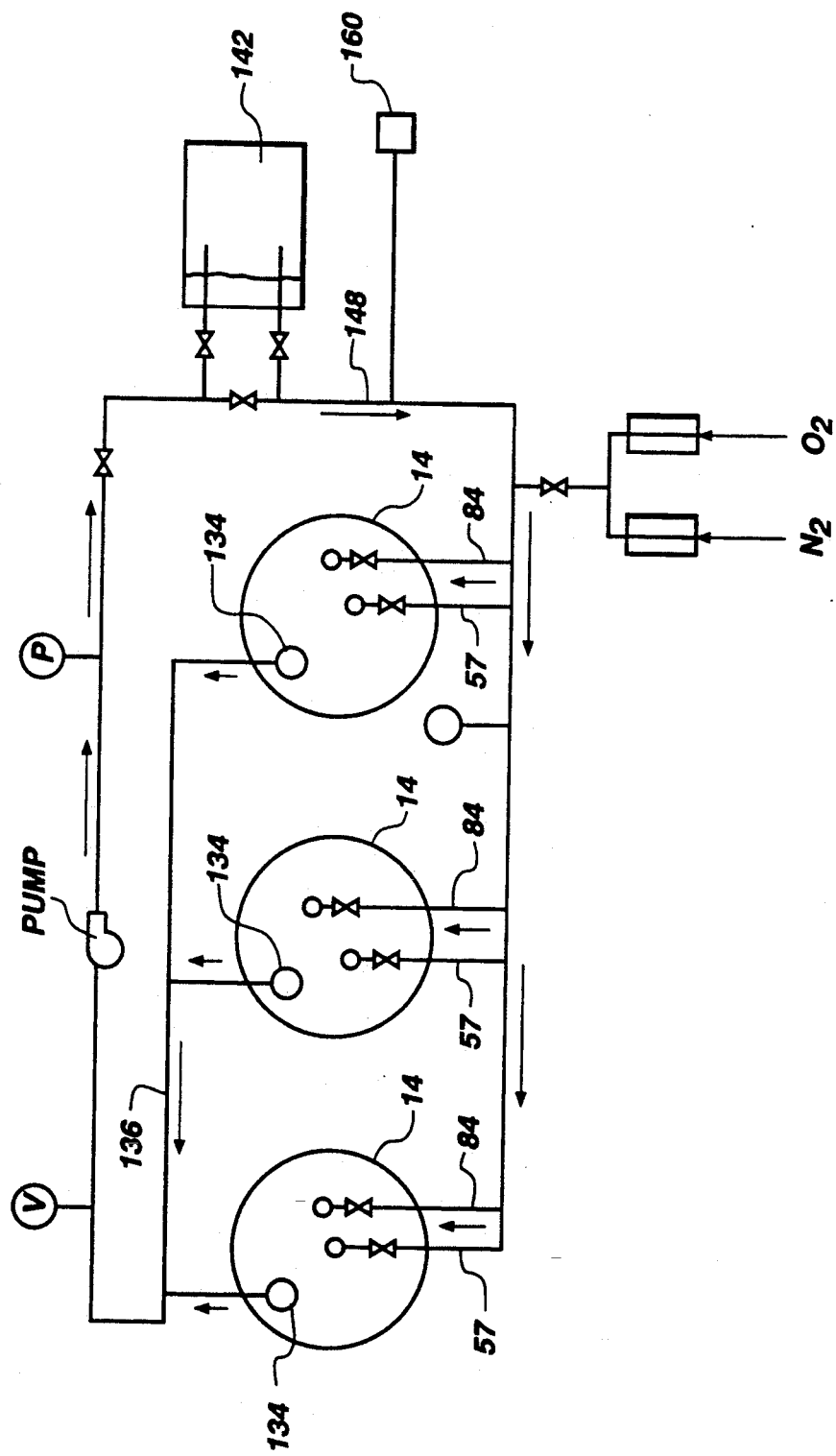
FIG. 7 is a schematic diagram of the exhaust gas recirculation system of a multiple reactor vessel system.

FIG. 6 illustrates the gas recirculating system. The filter 134 is connected by a conduit 136 to a valve 138 which may direct the effluent through conduit 140 to a scrubber 142 adapted for removing volatile organics, e.g. $CO_2$ from the effluent. Alternatively, valve 138 may direct the effluent gas through conduit 144. The effluent gas exiting the scrubber 142 is directed through conduit 148 to a compressor 150. As shown, conduit 144 connects with conduit 148 prior to that conduit's connection to compressor 150. Gases exiting compressor 150 are directed through conduit 152 to an aftercooler 154, e.g. a heat exchanger of conventional construction. The use of the aftercooler 154 is optional. A conduit 156 leads from the aftercooler to a bleed valve 155. Conduit 158, coupled with valve 155 is adapted to direct a bleed stream to an activated carbon adsorption filter 160. The main stream of effluent gas is directed through valve 155 and into conduit 162. Positioned along the length of conduit 162 are two valves, respectively designated valve 164 and valve 166. The valve 164 is adapted for introducing a supply of oxygen gas from an external supply source (not shown) into the effluent gas stream in conduit 162. The quantity of oxygen being introduced into that stream is adjusted to control the quantity of oxygen being introduced into the reactor vessel.

Valve 166 is adapted to receive other gas which may be beneficial to act as cometabilites in the biodegradation process such as methane with the recirculating gas stream. Also, nitrogen gas may be introduced in order to replace the oxygen and thus obtain anoxic/anaerobic operational conditions.

Conduit 162 directs the readjusted effluent gas back to the reactor vessel and is connected to tubular pipes 84 by means of a rotary valve 121A to provide a source of pressurized gas to the diffuser 111. Furthermore, conduit 162 is connected to pipe 57 by means of a rotary valve 121B to provide a source of pressurized gas for the airlift suspension system.

The instant gas supply system, by utilizing the carbon dioxide scrubbing unit and the oxygen enrichment apparatus, is adapted for minimizing the volume of effluent gas that must be treated in the carbon adsorption unit.

Figure 11:
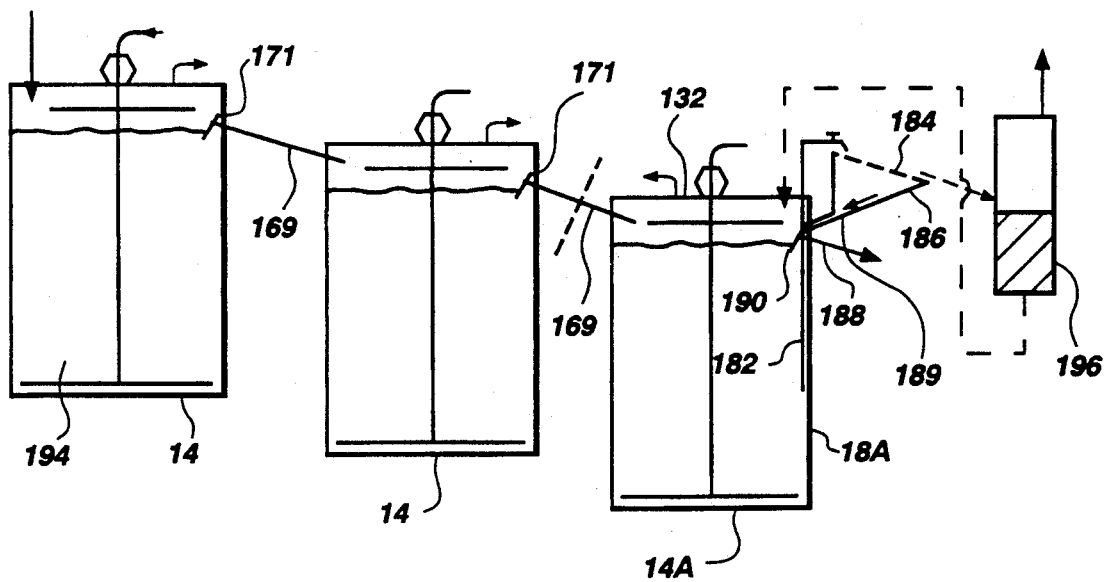
FIG. 11 is a schematic diagram illustrating a multiple reactor vessel embodiment.
Figure 12:
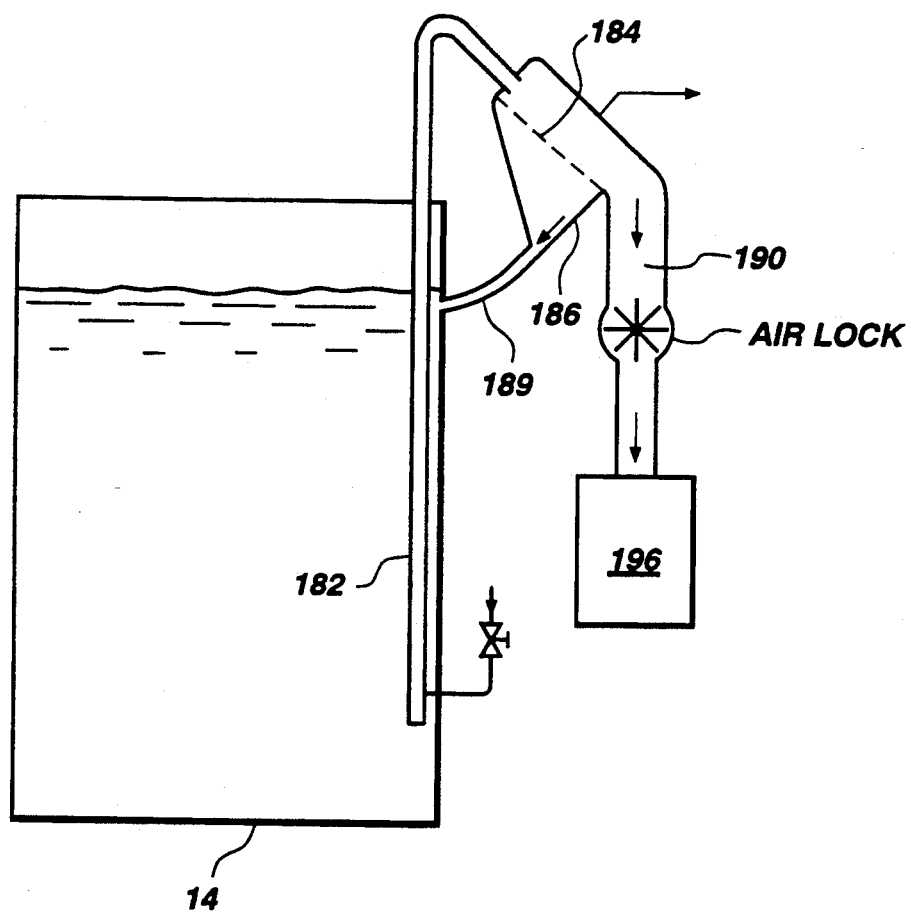
FIG. 12 is a sectional view of a screening means.

FIG. 11 illustrates a plurality of reactor tanks 14 arranged in series. All of the tanks 14 in FIG. 11 are connected with the effluent gas processing system shown schematically in FIG. 11. Each adjacent pair of tanks is connected together by means of a conduit 169 adapted for directing effluent slurry from one tank to another.

Figure 13:
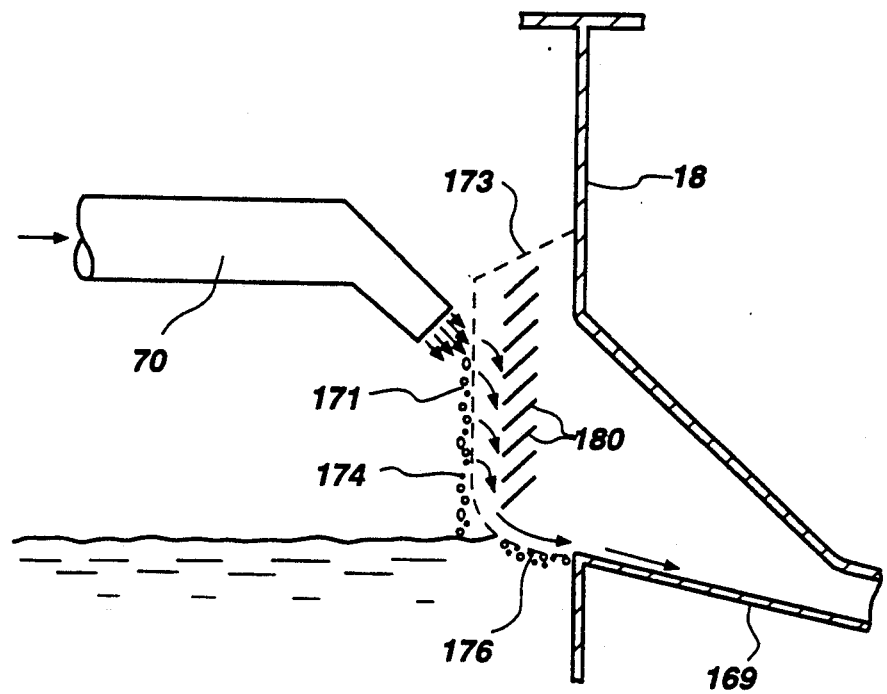
FIG. 13 is a side view of an effluent conduit screen.

In a preferred embodiment of the invention, a biomass-carrying medium is added to the slurries contained in one or more of the tanks 14 for purposes of retaining bacteria within each of the respective tanks and thereby assisting in maintaining a maximum biomass concentration within each tank. The use of biomass-carrying medium, such as silica, plastic pellets (e.g. PVC), granular activated carbon and certain ion exchange resins such as those marketed by the Rohm-Haas Corporation under the trademark "Amber-lite" is contemplated depending on the application. Alternatively, biomass-carrying medium manufactured from diatomaceous earth by the Manville Corporation may also be used. These carrying medium are directed to providing anchorage sites for the bacteria. Such carrying medium are of sufficient size that they may be screened and thereby separated from an effluent slurry stream leaving a given reactor vessel. As shown in FIG. 13, each conduit 169 is equipped at its outlet with a screen 171 adapted for retaining the biomass-carrying medium in the respective reactor vessel. As shown, the upright wall 18 of tank 14 defines an aperture therein which is mounted an open ended conduit 169. A housing 173 mounted on the interior upright surface of wall 18 retains a screen 171 having a vertical, upright section 174 spacedly positioned from wall 18 and a curvilinear section 176 which connects the upright section with the wall 18.

The openings in screen 171 are dimensioned to preclude a passage therethrough of the biomass-carrying medium, while permitting the passage of the liquid portion of the slurry together with particulates of a given smaller dimensional size. A plurality of flow directional vanes 180 are mounted within housing 173 and are adapted for diverting an incoming flow of slurry toward the curvilinear section 176 of the screen 171.

Figure 14:
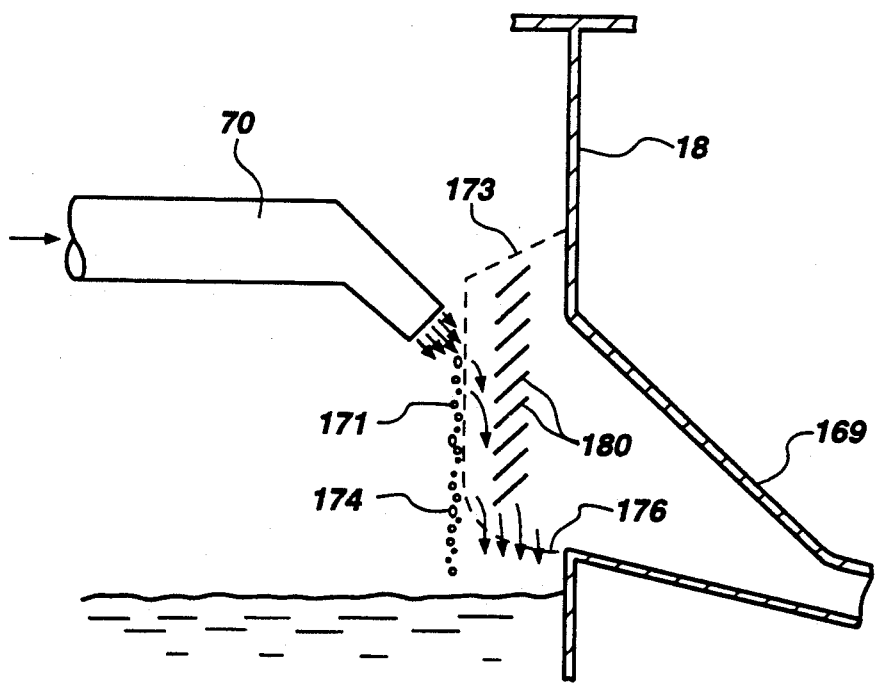
FIG. 14 is a side view of the effluent conduit screen shown in FIG. 13 wherein the slurry in the tank is not at full level.

The screens 171 are oriented and positioned so as to receive a flow of slurry exiting the airlift distributor arms 70. Since the airlift transporting material from the tank bottom will contain a higher concentration of coarse solids than the average slurry in the reactor, it is possible to regulate the quantity of coarse solids within the tank by means of this take-off device, and pass a fraction of this material on to the next reactor or out of the system. Control of coarse solids is essential in order to minimize torque on the mechanism. As shown in FIG. 14, when the slurry level is below the curvilinear screen section, the slurry entering the housing 173 is directed downward by the vanes 180 to the curvilinear screen section 176 and thereafter, the liquid portion of the slurry falls through that screen section 176 and is resultingly returned to the slurry within the tank 14. When the level of the tank-contained slurry is at or above the level of the screen section 176, the distributor arm discharged slurry passes through screen 171 and is directed along conduit 169 to the adjacent tank 14. Furthermore, in this condition, the slurry positioned contiguous the screen may likewise pass through the screen 176 and enter conduit 169 as shown by arrow 181.

The use of a biomass-carrying medium to retain bacteria may be adopted in one or more of the tanks 14. In one preferred construction, granular activated carbon is used in all of the reactor tanks 14. Carbon is utilized due to its high surface area-to-mass ratio. The spent carbon from the last tank may be either regenerated by conventional means or, alternatively, it may be recycled to the previous tanks to make up for the carbon lost in those tanks due to attrition, and thereby provide anchorage sites for anchorage-dependent bacteria.

The invention further provides a method of maintaining high biomass concentration within each reactor vessel by providing an anchorage medium within one or more of the reactor vessels. The anchorage medium provides anchorage sites for the bacteria to anchor themselves. Such anchorage medium are dimensioned such that they can be screened from effluent slurry exiting the reactor vessels and can thereby be maintained within their respective reactor vessels.

In the most preferred embodiment, such a medium is placed in all of the tanks with the exception of the last tank 14A. In this last tank 14A, which may be denominated a polishing reactor, granular activated carbon may be substituted for the biomass-carrying medium. The use of activated carbon may be accompanied by apparatus directed for regeneration of that carbon. As shown in FIG. 8, a second airlift system 182, having a construction known in the art, is mounted proximate the upright wall 18A of the tank 14A. The system 182 extends upward from the tank 14A, through the sealant cover 132. The system is fitted with a laterally extending conduit adapted for discharging the airlifted slurry outward over an inclined screen 184 mounted over atop a collection basin 186 having an angulated floor 188. The floor 188 is angled to a collection drain 189 which returns the slurry back to tank 14 through the upright wall 18 of that tank. The screen 184 is sized to trap the granular particulate carbon. Due to the inclination of screen 184, the carbon trapped thereon is directed by gravity to a carbon regeneration system 196 which may be of a conventional type, e.g. a kiln. The carbon withdrawal may be operated continuously or intermittently. Any loss in reactivated granular carbon will be made up with fresh carbon.

Tank 14A is fitted with an outlet 190 adapted for drawing off a quantity of decontaminated, processed slurry which is then directed to a dewatering process (not shown).

FIG. 11 also illustrates, in schematic form, a series of reactor tanks 14 wherein the gas supply means of the second and third tank are identical to that previously disclosed in FIG. 6. The gas supply means of sealed tank 194 has been modified whereby no oxygen is directed therethrough into the tank, i.e. tank 194 is adapted for anaerobic operation. As shown, the gas supply system of tank 194 is adapted to introduce methane, nitrogen, or other carrier gases into the tank for the use of mixing the slurry. The operation of the first reactor anaerobically facilitates the breakdown of certain chlorinated compounds contained within the slurry. The operation of the first reactor in an anaerobic mode is optional and not required in each application. Any of the reactors may be operated anaerobically. For example, one of the reactors or all of them could be so operated.

Whereas wastewater treatment facilities which utilize bacterial activity as a component in their processing regime typically are constructed and adapted for treating sewage having a solids concentration of 0.02%–0.1%, which subsequent to processing is concentrated to a slurry having a 0.3–1.2% solids concentration, the instant reactor system is adapted for processing slurries having solids concentrations above 6% by weight. Typical operation of the invention is anticipated to effectively treat slurries having a 20%–50% solids concentration.

Figure 15:
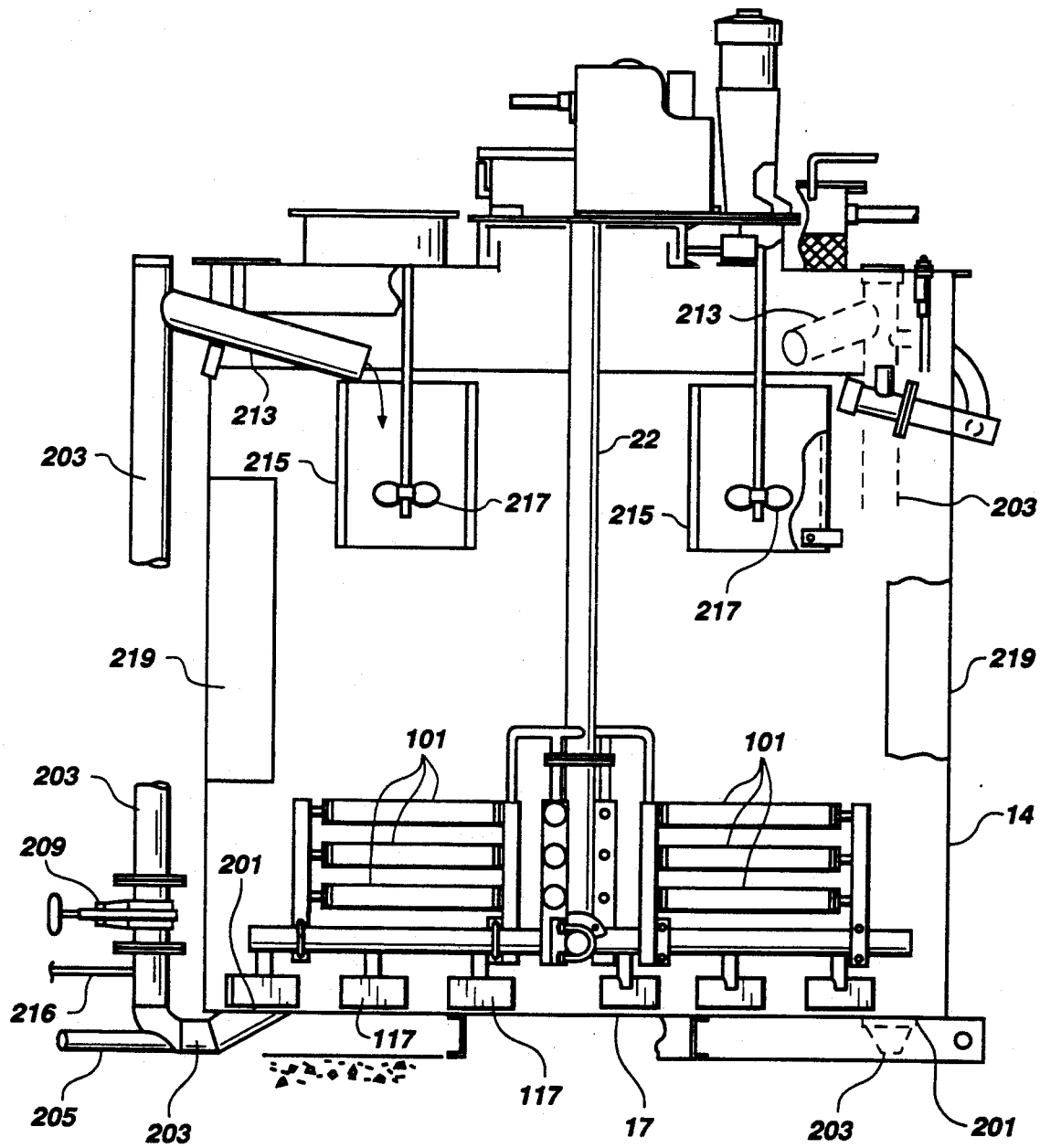
FIG. 15 is a cross-sectional view of the alternative embodiment of the reactor vessel of the invention.
Figure 16:
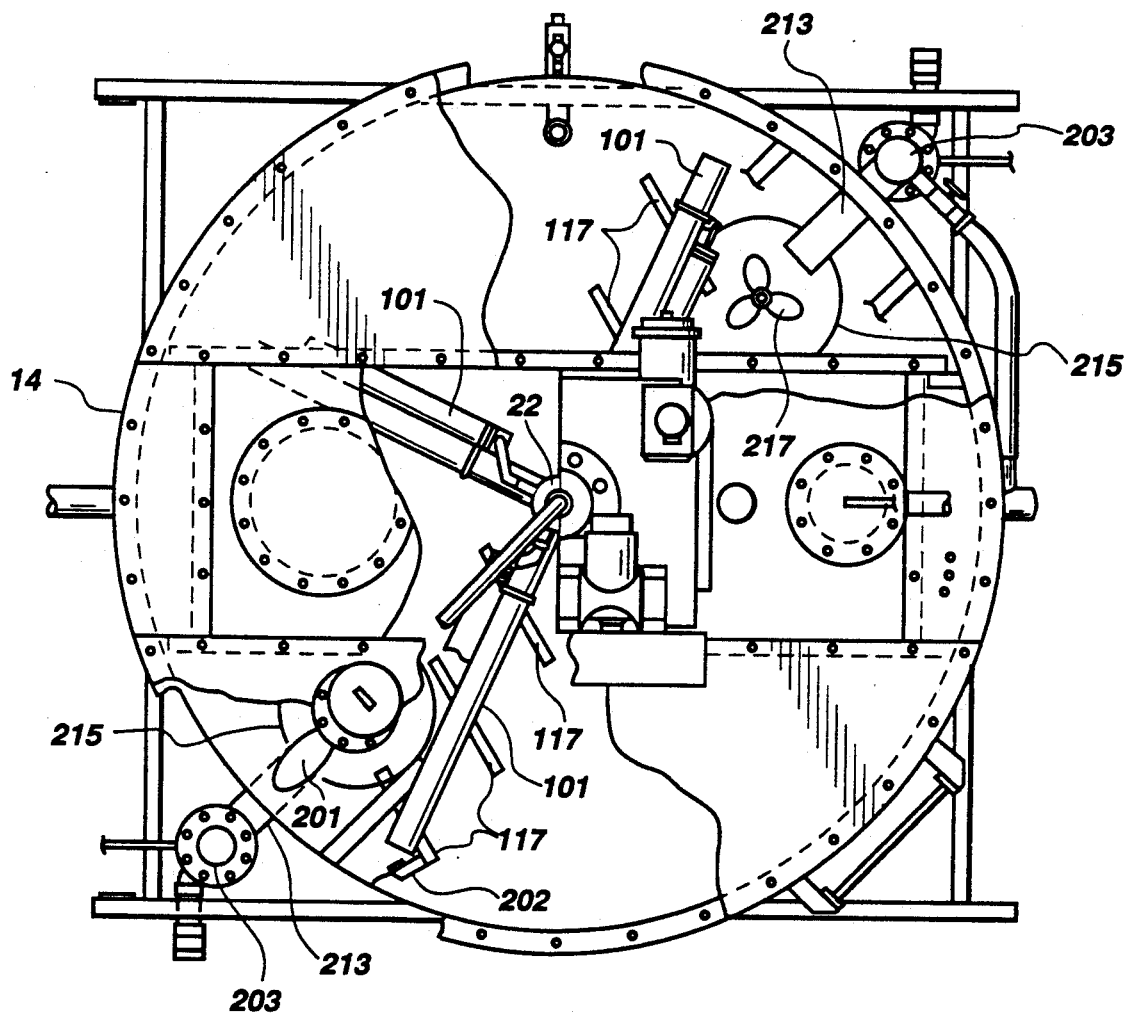
FIG. 16 is a top sectional view of the reactor vessel of FIG. 15.
Figure 17:
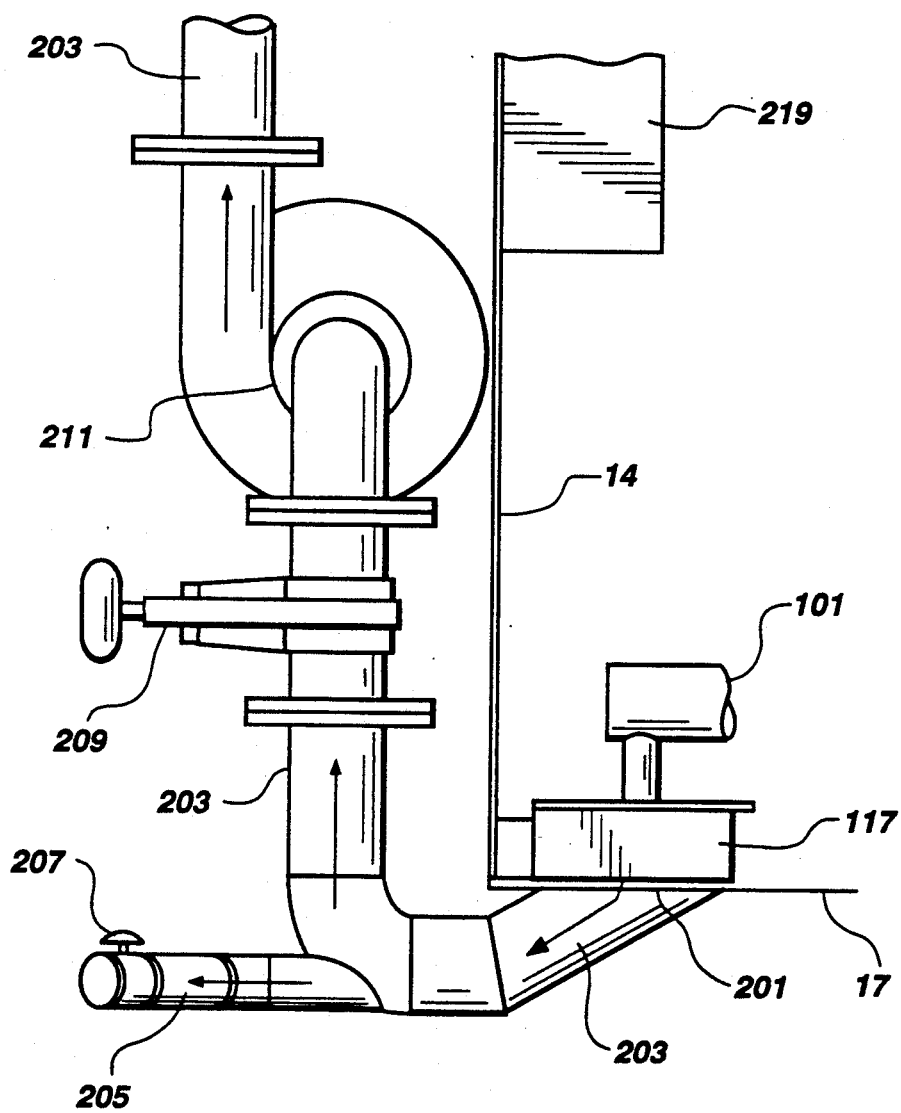
FIG. 17 is a sectional side view of the reactor vessel outlet of the embodiment of FIG. 15.

FIGS. 15–17 illustrate an alternative reactor vessel construction wherein the central airlift illustrated in FIG. 3 has been replaced by an alternative solids recirculation system. As shown in FIG. 15, the bottom 17 of the tank 14 defines an outlet opening 201 therein which provides an egress for the slurry as well as solid materials which have settled out of the slurry onto the bottom 17. A conduit 203 is sealedly secured to the bottom 17 on the exterior surface thereof about the outlet opening 201. The conduit 203 includes a discharge drain 205 adapted to remove and discharge a selected quantity of the slurry and/or solids which have been introduced into conduit 203 by means of outlet 201. Discharge conduit 305 functions as a means of draining the tank. Further, conduit 205 may be used as a means of removing accumulated solids from the bottom of the conduit 305 either by draining (using the hydrostatic head in the tank) or high-pressure backflushing using water or slurry. As shown in FIG. 17, discharge conduit 205 is fitted with a valve 207 which permits the user to selectively control the quantity of effluent passing through discharge conduit 205 during draining or backflushing. Valve 207 may be used to isolate conduit 205 when it is not in use. Conduit 203 is directed vertically upwards from its connection to the bottom 17 along the sidewall of the tank 14. Conduit 203 is likewise fitted with a valve 209 adapted to isolate the lower portion of conduit 203 when backflushing. A vertical flow of slurry through conduit 203 may be accomplished by means of an airlift. As shown in FIG. 15, an air supply pipe 216 communicates with conduit 203 and functions to provide a quantity of air to the slurry contained within conduit 203 to effect an airlift operations. Alternatively, as centrifugal pump 211 may be fitted onto conduit 203. As shown in FIG. 17, a pump 211 is mounted is conduit 203 for purposes of directing the slurry and solids upwards through conduit 203. In other constructions, a propeller pump or other type pumping apparatus may be associated with conduit 203 to provide a means of directing slurry upwards through conduit 203.

As illustrated in FIG. 15, conduit 203 extends upwards to a location proximate the top of the reactor tank 14. At its upper end, conduit 203 is fitted with a laterally extending, somewhat downwardly oriented discharge pipe 213. Discharge pipe 213 extends through an aperture in the sidewall of tank 14. Discharge pipe 213 is adapted to receive a quantity of slurry and solids from conduit 203 and direct it into a vertically oriented, open-ended draft tube 215 positioned within the reactor vessel. An impeller 217 is mounted within the interior of draft tube 215. The discharge pipe 213 is adapted to discharge the lifted slurry and solids directly into the draft tube such that they are directly within the flow path created by the impeller 217 to promote dispersion of oily/tarry materials into the aqueous phase. The impeller 217 further functions to disperse solids, increase mass transfer within the tank and otherwise reduce the size of solids within the tank by the shear induced by the impeller 217.

A plurality of vertically oriented baffles 219 are positioned on the inner perimeter of the tank 14. These baffles are adapted to facilitate optimized flow conditions within the tank's interior.

In contrast to the previously described embodiment, this alternative construction orients the rakes 117 so as to direct the solids collected on bottom 17 to the outer perimeter of the vessel bottom, thereby directing the solids to the outlets 201 (FIG. 16). As shown in FIG. 16, the outermost rake blade 117A may be fitted with a scoop-like member 202 which is adapted to move solids which have settled proximate the junction of the tank bottom and the tank sidewall, toward the outlets 201. Member 202 may be formed of a resilient material whereby it functions similar to a squeegee in scouring the tank sidewall and bottom.

As shown to advantage in FIG. 16, the alternative embodiment may be fitted with two or perhaps more outlets 201, conduits 203 and draft tubes 215.

The alternative construction permits the use of a solid core drive shaft 22. In other constructions, a hollow core drain shaft may be utilized. FIGS. 20-24 illustrate an alternative reactor configuration. As shown, the tank 14 is fitted with a vertical drive shaft 22A which is hollow, being generally tubular in construction. Mounted within the drive shaft 22A is a tubular pipe 214. As shown to advantage in FIG. 22, pipe 214 extends upward from seal 225 to a height above the anticipated slurry level 216 within the tank. The region of the interior of drive shaft 22A and the exterior of pipe 214 forms a channel for directing pressurized air from a supply means 218 to outlets 220 and their associated air hoses 110. The interior of pipe 214 forms a conduit for airlifting slurry upwards from the bottom regions of the tube. As shown, an air conduit 57 is positioned within the pipe 214. A diffuser 60 is mounted on the lower end of air conduit 57. As shown, air conduit 57 is connected to a supply 222 of pressurized air.

The diffusers 111 are formed by four vertical banks of tubular-shaped diffusers 111 which extend radially from the drive shaft 22A.

Figure 22:
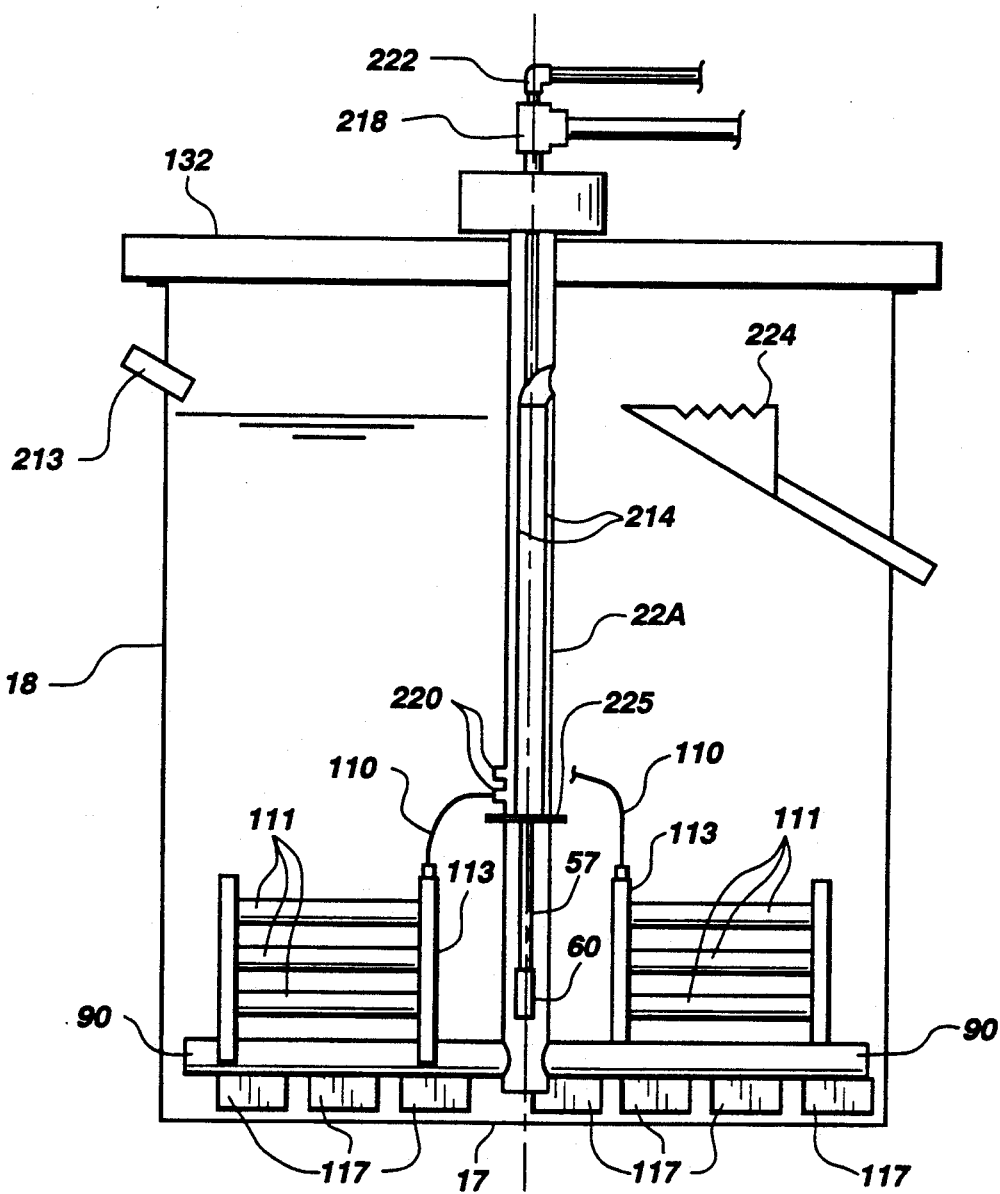
FIG. 22 is a cross-sectional view of the bioreactor vessel of FIG. 20 taken along sectional lines 22—22.

As shown in FIG. 22, an inlet tube 213 from an external recirculation means of the type shown in FIG. 15 extends through the sidewall of the tank. It should be understood that an external circulation system of the type shown in FIG. 15 may be mounted on the tank of FIG. 22. Also illustrated in FIG. 22 is a screen 224 which is adapted to drain off a quantity of slurry proximate the surface level of the slurry and direct that slurry away from the tank.

FIG. 24 illustrates a staged impeller fitted drive shaft 22A. As shown, a tubular drive shaft 226 is mounted concentrically about the drive shaft 22A. A plurality of impellers 28 are mounted spacedly along the height of the drive shaft 226 to extend outwardly therefrom. The drive shaft 226 is mounted to a drive means 228. Since the drive shaft 226 is mounted independently rotatable from drive shaft 22A, the drive shaft 226 and hence impellers 28 may be rotated on a speed different from drive shaft 22A.

Figure 18:
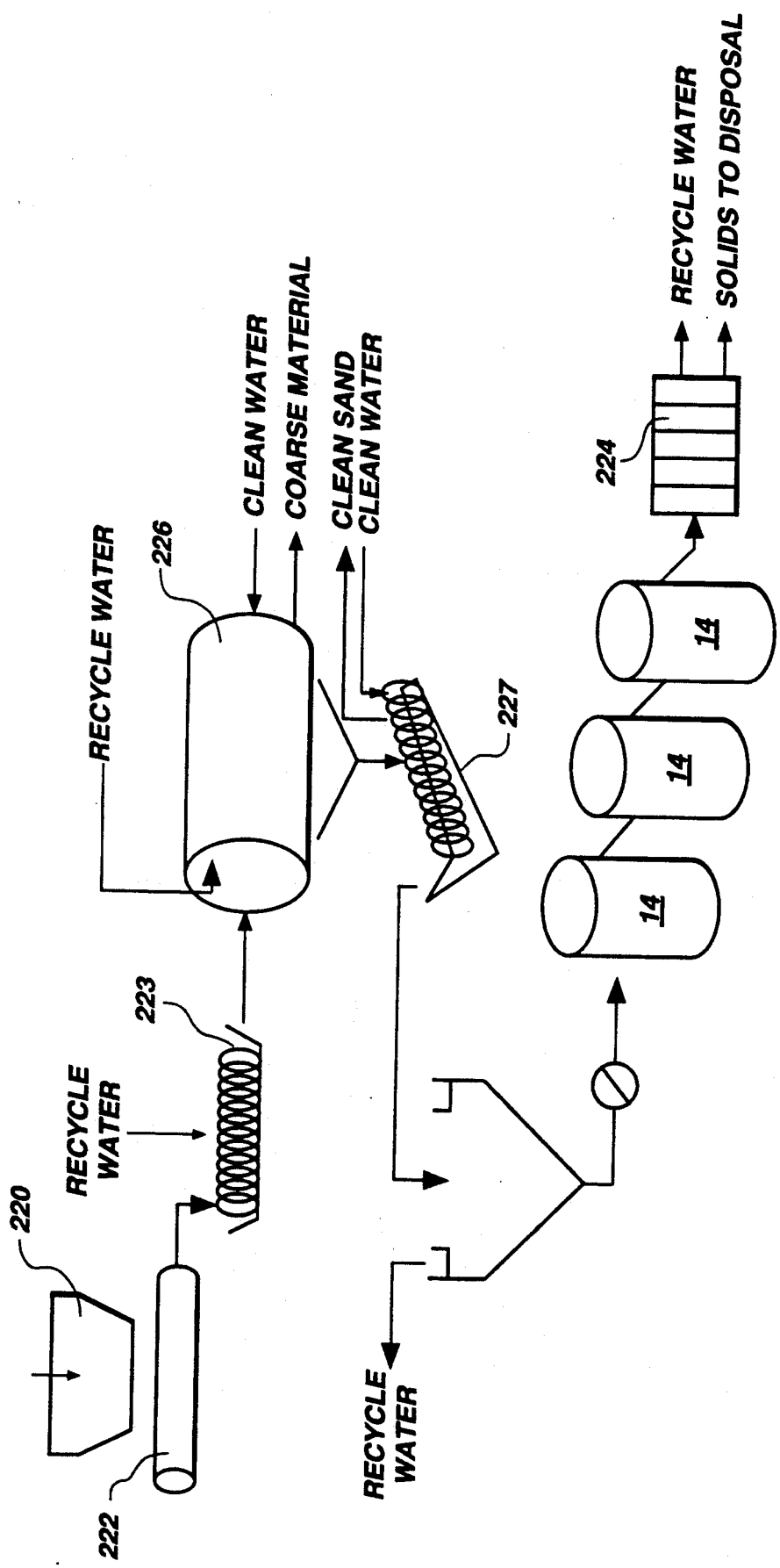
FIG. 18 is a schematic flow sheet of a bioremediation system of the invention.

FIG. 18 illustrates a bioremediation flow sheet which depicts a preferred association of apparatus for performing bioremediation of contaminated soil.

Prior to the introduction of the soil into the reactor vessel, some pretreatment of the soil is required. This pretreatment is specifically directed to removing oversize material. As shown, the contaminated soil is initially introduced into a hopper 220 which directs it to a pan feeder 222. The pan feeder 222, being of a slow speed type, conveys the soil to a "log-washer" or attrition mill 223 or similar device designed to break up any soil clumps, at which point recycled water from the dewatering device 224 is introduced into the soil to form a slurry. The slurry is then introduced into a trommel screen or vibrating screen 226. The screen is adapted to remove coarse material, gravel, and other debris on the order of ¼ inch diameter from the slurry. While on the screen, additional recycled water from the dewatering device 224, clean water at the end of the trommel is added in order to wash the coarse oversize particles.

The slurry is subsequently removed from the screen and fed into a countercurrent washing screw classifier 227. Clean water is added to the slurry while the classifier operates to remove solid material of between ¼ inch diameter through 20 mesh (American Standard Sieve). At this juncture, most of the sand of the slurry will have been sufficiently washed that it can be discharged. The finer materials and the excess washwater that cannot be recycled are then passed by means of feed storage thickener into a series of bioslurry reactors 14. The tanks 14 process the slurry as described above. Subsequent to the processing in the tanks 14, the slurry is directed to a dewatering apparatus 224. In FIG. 14, the dewatering apparatus may be a pressure filter, thermal dryer, vacuum filter or centrifuge.

Figure 19:
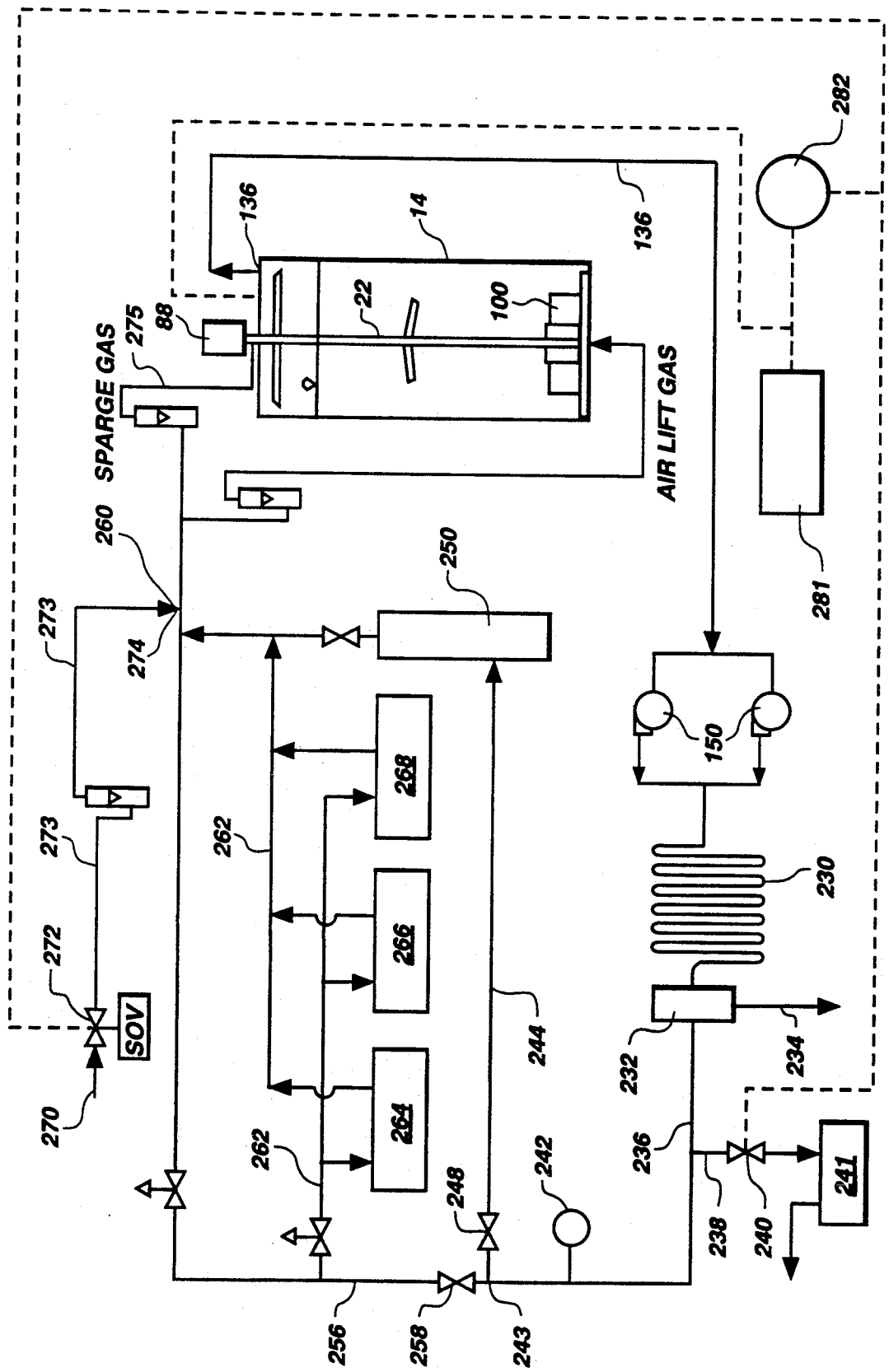
FIG. 19 is a schematic flow sheet of the gas recirculation system of the invention.
Figure 20:
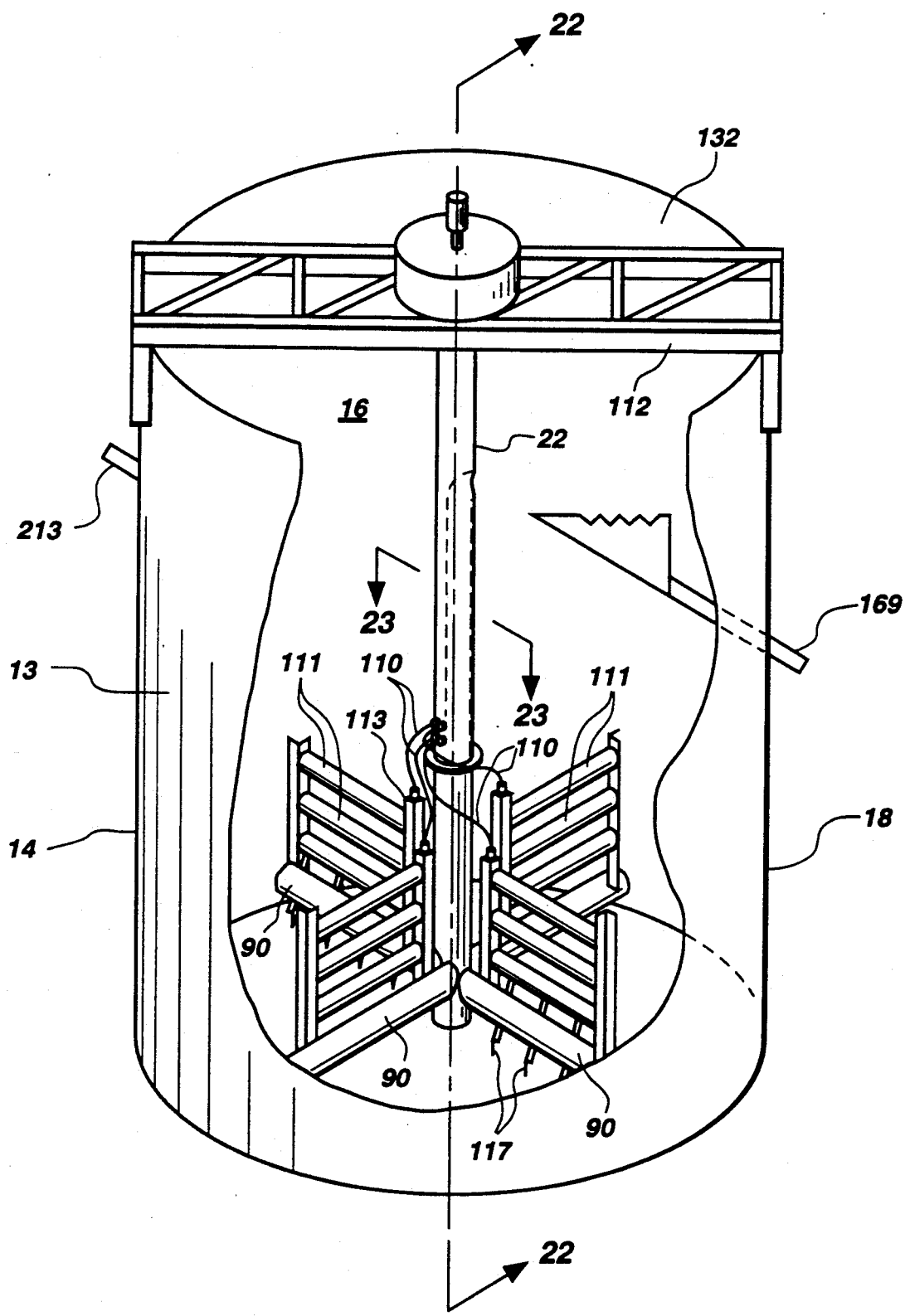
FIG. 20 is an elevated perspective view of an alternative bioreactor vessel of the invention.
Figure 21:
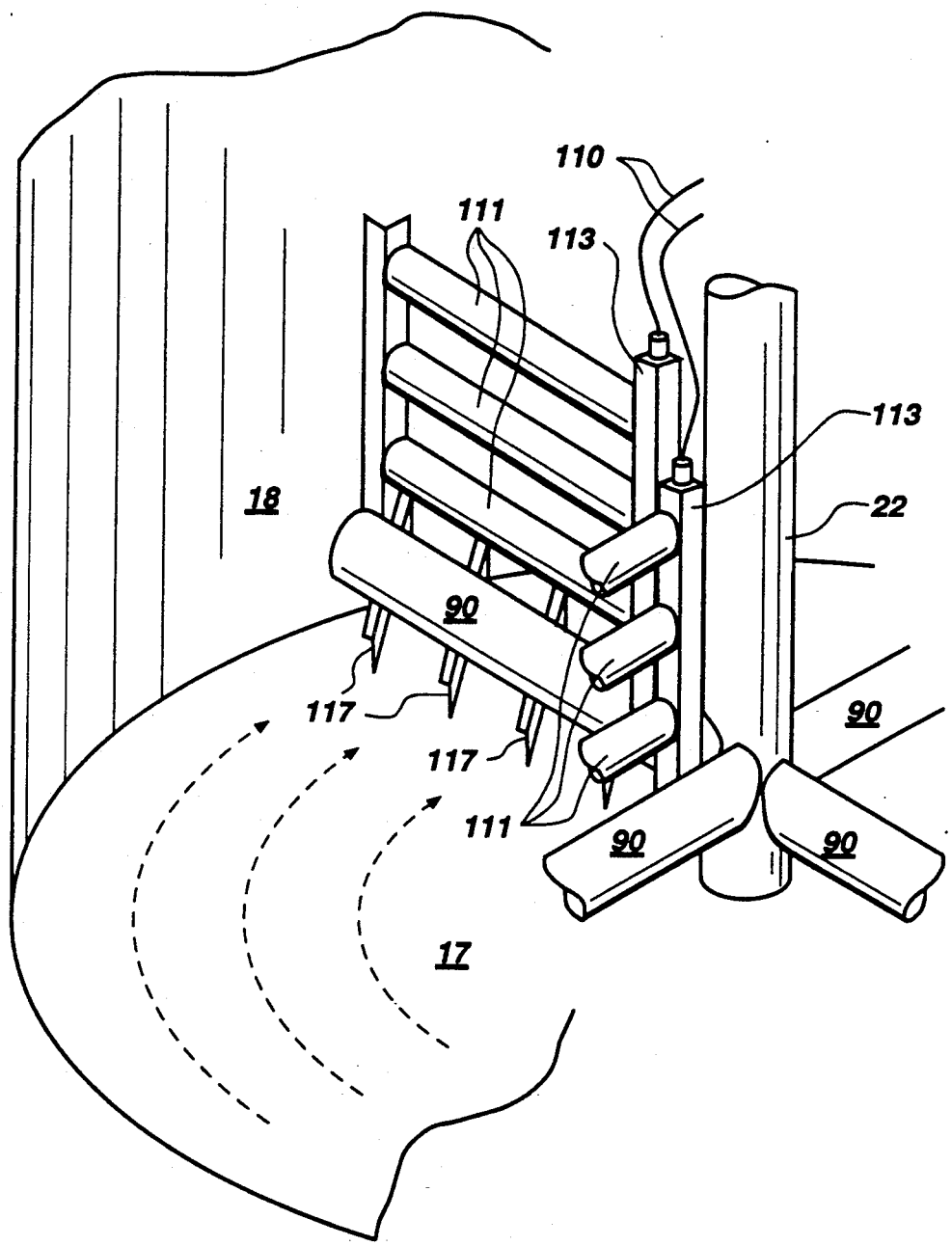
FIG. 21 is a partial sectional, elevated perspective view of the diffuser elements and rake mechanism of the bioreactor vessel of FIG. 20.
Figure 23:
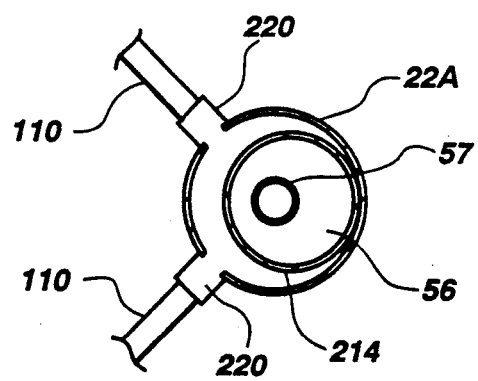
FIG. 23 is a top cross-sectional view of the central drive shaft of the bioreactor vessel of FIG. 20 taken along sectional lies 23—23.

FIG. 19 illustrates in schematic form, a preferred construction of the exhaust gas recirculation system of the reactor vessel of the invention. As shown, the sealed tank 14 is fitted with a gas outlet conduit 136. The conduit 136 is fitted with one or more air compressors 150 which direct the exhaust gas into a condensing loop 230. A condensate knockout 232 connected to the condensing loop 230 includes a condensate discharge conduit 234 adapted for returning the condensate to tank 14. After passing through condensate knockout 232, the exhaust gas is directed into conduit 236. Conduit 236 is fitted with an exhaust air bleed conduit 238 which is fitted with a control valve 240. The bleed conduit 238 is fitted with a carbon filter 241. Exhaust gas exiting the carbon filter 240 may be discharged as to the environment.

The exhaust gas in conduit 236 is directed past an inlet air pressure gage 242 to junction 243. Junction 243 defines two paths. A first conduit 244 extends from junction 243 past valve 248 to caustic scrubber 250. The exhaust gas exiting the scrubber 250 is directed past valve 252 to junction 254. A second conduit 256 extends from junction 243 past valve 258 to gas supply header 260. A conduit 262 is mounted in flow communication with second conduit 256. Conduit 262 is fitted along its length with an oxygen analyzer 264 and a carbon dioxide analyzer 266, and optionally, a gas chromatograph 268. Conduit 262 extends from the analyzer to flow-communicating junction 254 with conduit 244. Conduit 244 extends to conduit 256 to form a flow-communicating connection therewith at junction 269.

An air or oxygen source 270 is connected by means of a control valve, e.g. a solenoid-operated valve 272 to conduit 273. Conduit 273 is flow communicated to conduit 236 at junction 274.

Gas supply header 260 is adapted to direct the exhaust gas through conduit 275 which directs the gas to gas supply means 88 which subsequently introduces the exhaust gas into the tank 14 through diffusers 100.

Alternatively, the gas supply header 260 directs the gas through conduit 291 which directs the gas to conduit 57, which facilitates the exhaust gas to be introduced into the tank 14 through the airlift system.

The gas analyzers have control capability and can actuate control valves at predetermined setpoints. For example, if carbon dioxide, due to the bacteria's metabolic activities, increases above the setpoint, a portion of the gas stream is passed through a scrubber until the carbon dioxide concentration has been reduced to an acceptable level again. Likewise, when the oxygen concentration due to bacterial uptake drops below the setpoint, air or pure oxygen is admitted to the system until the ambient oxygen concentration has been restored. An equivalent volume of air is treated through a carbon adsorption column to remove any residual non-biodegradable organic volatile compounds. Operation in the gas recirculation mode reduces the cost for expensive volatile emissions treatment significantly. The reactor is always operated at a slight vacuum of 1"-2" W.C. to avoid any undesired emissions.

As shown in FIG. 18, the tank 14 may be fitted with a manometer 281 and a photohelic control means 282. Preferably, the reactor vessel is operated at a slightly negative internal pressure, e.g. a vacuum. The photohelic 282 is connected to the valve 240 which controls the exhaust air bleed from conduit 236. By opening valve 240, the user can release pressure from the tank 14. The photohelic 282 is also connected to the solenoid valve 272 whereby the user can increase the pressure in the tank 14 by introducing more air into the tank.

Depending on the application, any number of reactors can be arranged in a cascading system to permit continuous feed and overflow. The more stages are arranged in series, the more the system approaches true plug flow conditions. At the same time, optimum biokinetic rate is achieved in each stage. The bacteria population is fully acclimated to the organic contaminants and biomass concentration has reached an optimum in accordance with substrate concentrations available.

Alternatively, the reactor of the invention can be run in a batch or a semi-continuous feed mode. From a process engineering point of view, such a mode of operation is more easily controlled, but kinetic rates will be slower because of the lag phase in bacterial activity as a result of acclimatization and biomass growth.

Total hydraulic residence time in these reactors will vary depending on the nature of the organic contaminants, their concentrations, and clean-up level required. The slurry is finally dewatered. The dewatering may be accomplished in a variety of ways, for example, a pressure filter, vacuum filter, or centrifuge 224. The most efficient and economical dewatering equipment is dependent on the characteristics and the quantities of slurry to be processed. It must be evaluated on a case-by-case basis.

FIG. 18 illustrates a typical bioremediation flow sheet using bioslurry reactors as the primary treatment step. Other flow sheets are possible as long as they achieve the pretreatment objectives of slurrying, washing, and classifying into different size fractions.

It is to be understood that the embodiments of the invention herein described are merely illustrative of the application of the principles of the invention. Reference herein to details of the illustrated embodiment is not intended to limit the scope of the claims which themselves recite those features regarded as essential to the invention.

What is claimed:

1. Apparatus for use in treating, through use of bacteria, minerals, soils or sludges which have been contaminated with hazardous waste organic compounds, said apparatus comprising:

slurry-forming means for adding water to said minerals, soils or sludges to form a slurry;

screening means, associated with said slurry-forming means, for removing all solid material of a preselected size from said slurry;

a container means associated with said screening means for containing a quantity of slurry and bacteria suited to treat hazardous waste organic compounds;

an oxygen supply means mounted within said container means, said oxygen supply means including at least one flexible porous membrane diffuser adapted for receiving a supply of oxygen-containing gas and distributing said gas into said container means in a form of fine bubbles;

a mixing means mounted within said container means for mixing and recirculating the slurry contained within said container means;

an exhaust gas recycling means mounted on said container means for drawing off a quantity of exhaust gases from said container means, treating said exhaust gas by extracting carbon dioxide therefrom, injecting oxygen into said quantity of exhaust gas and thereafter reintroducing said treated exhaust gas into said container means by means of said oxygen supply means, wherein said container means is sealed to prevent escape of exhaust gases; and dewatering means, associated with said container means, for receiving said slurry from said container means and dewatering said slurry.

2. The apparatus of claim 1, wherein said slurry-forming means includes an attrition mill.

3. The apparatus of claim 1, wherein said screening means includes a trommel screen.

4. The apparatus of claim 1, wherein said dewatering means includes a pressure filter.

5. The apparatus of claim 1 wherein said dewatering means includes a vacuum filter.

6. The apparatus of claim 1, wherein said dewatering means includes a centrifuge.

7. The apparatus of claim 1 wherein said container means includes a plurality of tanks.

8. Apparatus for use in treating, through use of bacteria, minerals, soils or sludges, which have been contaminated with hazardous waste organic compounds, said apparatus comprising:

slurry-forming means for adding water to said minerals, soils or sludges to form a slurry;

screening means, associated with said slurry-forming means for screening said slurry to remove therefrom all solid material over a preselected size, to constitute a quantity of sized, slurry-borne minerals, soils or sludges;

washing means associated with said screening means for washing said sized quantity of sized minerals, soils or sludges;

classifying means, associated with said washing means for classifying said quantity of sized minerals, soils or sludges, said classifying means being adapted for removing fine material of a preselected size and excess water from said slurry;

a container means, associated with said classifying means, for containing a quantity of slurry and bacteria suited to treat hazardous waste organic compounds;

an oxygen supply means, mounted within said container means, said oxygen supply means including at least one flexible porous membrane diffuser adapted for receiving a supply of oxygen-containing gas and distributing said gas into said container means in a form of fine bubbles;

a mixing means mounted within said container means for mixing and recirculating the slurry contained within said container means;

an exhaust gas recycling means mounted on said container means for drawing off a quantity of exhaust gases from said container means, treating said exhaust gas by extracting carbon dioxide therefrom, injecting oxygen into said quantity of exhaust gas and thereafter reintroducing said treated exhaust gas into said container means by means of said oxygen supply means, wherein said container means is sealed to prevent escape of exhaust gases; and dewatering means, associated with said container means, for receiving said slurry from said container means and dewatering said slurry.

9. The apparatus of claim 8, wherein said slurry-forming means includes an attrition mill.

10. The apparatus of claim 8, wherein said screening means includes a trommel screen.

11. The apparatus of claim 8, wherein said dewatering means includes a pressure filter.

12. The apparatus of claim 8, wherein said dewatering means includes a vacuum filter.

13. The apparatus of claim 8, wherein said dewatering means includes a centrifuge.

14. The apparatus of claim 8, wherein said classifying means includes a countercurrent washing screw classifier.

15. A reactor vessel for use in treating, through use of bacteria, slurries containing minerals, soils, or sludges, including such slurries as may be contaminated with hazardous waste organic compounds, said slurries having a solids concentration by weight of at least approximately 6% or more, said vessel comprising:

a container means, said container means having a bottom, for containing a quantity of slurry;

an oxygen supply means mounted within said container means, said oxygen supply means including at least one flexible porous membrane diffuser adapted for receiving a supply of oxygen-containing gas and distributing said gas into said container means in a form of fine bubbles;

a means for mixing and recirculating the slurry contained within the tank;

a means for withdrawing solids that have settled onto said bottom of said container means; a means for transporting said withdrawn solids upwards and reintroducing said solids into said container means at a location above said bottom; and rake means mounted adjacent a bottom of said container means thereof, for scraping said bottom and directing any concentrations of solids deposited on said bottom to a collection location within said vessel proximate said means for withdrawing solids.

16. The reactor vessel of claim 15, wherein said container means is fitted with an airlift means for upwardly transporting said solids from said collection location and thereafter introducing said solids into said slurry above said container means bottom.

17. The reactor vessel of claim 15, wherein said container means includes a biomass-carrying medium screening means which includes a quantity of biocatalyst carrier particulates, adapted for bacteria and facilitating their attachment thereon, being placed in said slurry within said container means, and a screen mounted over a discharge port of said container means adapted for capturing said particulates from slurry discharged as effluent from said container means.

18. The reactor vessel of claim 16, wherein said airlift means is adapted for transporting said solids to a height above a surface level of the slurry contained within said container means and thereafter discharging said solids over said surface level.

19. The reactor vessel of claim 16, wherein said airlift means is adapted for discharging said solids over a screen mounted within said container means and over a discharge conduit adapted for directing slurry as effluent away from said container means.

20. The reactor vessel of claim 15 wherein said flexible porous membrane diffuser is generally upright.

21. The apparatus of claim 1 wherein said mixing means comprises:

an outlet defined in a bottom of said container means;

a conduit, having a first end and a second end, said first end being mounted on said outlet, said conduit extending outwardly away from said container means, and then upwardly along an exterior surface of said container means along a height of said container means, said conduit extending into an interior of said container means at its second end;

an open-ended draft tube mounted vertically upright within said container means, said second end of said conduit being mounted to empty into said open-ended draft tube; and a driven impeller mounted within said draft tube;

wherein said second end of said conduit is oriented to discharge slurry and solids contained therein into said draft tube at a location elevationally above said impeller.

* * * * *